(12) United States Patent
Chow

(10) Patent No.: US 7,247,274 B1
(45) Date of Patent: Jul. 24, 2007

(54) PREVENTION OF PRECIPITATE BLOCKAGE IN MICROFLUIDIC CHANNELS

(75) Inventor: Andrea W. Chow, Los Altos, CA (US)

(73) Assignee: Caliper Technologies Corp., Mountain View, CA (US)

( * ) Notice: Subject to any disclaimer, the term of this patent is extended or adjusted under 35 U.S.C. 154(b) by 689 days.

(21) Appl. No.: 10/292,401

(22) Filed: Nov. 12, 2002

Related U.S. Application Data

(60) Provisional application No. 60/338,040, filed on Nov. 13, 2001.

(51) Int. Cl.
*B01L 3/02* (2006.01)
*B32B 5/02* (2006.01)
*B32B 27/04* (2006.01)
*B32B 27/12* (2006.01)
*G01N 15/06* (2006.01)

(52) U.S. Cl. .................. 422/100; 422/50; 422/68.1; 422/101; 422/102; 422/103; 422/104; 422/81; 422/82; 436/43; 436/52; 436/56; 436/63; 436/180; 73/1.01; 73/1.02

(58) Field of Classification Search .............. 422/100, 422/101, 102, 103, 104, 50, 68.1, 81, 82; 436/43, 52, 53, 63, 180; 73/1.01, 1.02, 53.01; 137/1, 2, 3, 4, 5, 8, 9, 15.01, 15.04, 15.05, 137/87.01, 88, 89
See application file for complete search history.

(56) References Cited

U.S. PATENT DOCUMENTS

| 4,390,403 | A | 6/1983 | Batchelder |
| 4,908,112 | A | 3/1990 | Pace |
| 5,126,022 | A | 6/1992 | Soane et al. |
| 5,271,724 | A | 12/1993 | van Lintel |
| 5,277,556 | A | 1/1994 | van Lintel |
| 5,304,487 | A * | 4/1994 | Wilding et al. ............... 435/29 |
| 5,375,979 | A | 12/1994 | Trah |
| 5,498,392 | A | 3/1996 | Wilding et al. |
| 5,571,410 | A | 11/1996 | Swedberg et al. |
| 5,585,069 | A | 12/1996 | Zanzucchi et al. |
| 5,593,838 | A | 1/1997 | Zanzucchi et al. |

(Continued)

FOREIGN PATENT DOCUMENTS

WO  WO-9405414  3/1994

(Continued)

OTHER PUBLICATIONS

Dasgupta, P.K. et al., "Electroosmosis: A Reliable Fluid Propulsion System for Flow Injection Analysis," *Anal. Chem.* (1994) 66:1792-1798.

(Continued)

*Primary Examiner*—Brian Sines
(74) *Attorney, Agent, or Firm*—Ann C. Petersen; Donald R. McKenna

(57) ABSTRACT

The present invention provides novel microfluidic devices and methods for preventing/ameliorating formation of precipitate blockages in microfluidic devices. In particular the devices and methods of the invention utilize microchannels of specific cross-sectional configuration and of specific arrangement as well as application of AC current orthogonal to the direction of fluid flow, in order to preventing/ameliorating formation of precipitate blockages in microfluidic devices.

11 Claims, 4 Drawing Sheets

U.S. PATENT DOCUMENTS

| | | | |
|---|---|---|---|
| 5,603,351 | A | 2/1997 | Cherukuri et al. |
| 5,635,358 | A | 6/1997 | Wilding et al. |
| 5,637,469 | A | 6/1997 | Wilding et al. |
| 5,699,157 | A | 12/1997 | Parce |
| 5,716,852 | A | 2/1998 | Yager et al. |
| 5,750,015 | A | 5/1998 | Soane et al. |
| 5,800,690 | A | 9/1998 | Chow et al. |
| 5,858,187 | A | 1/1999 | Ramsey et al. |
| 5,858,195 | A | 1/1999 | Ramsey |
| 5,869,004 | A | 2/1999 | Parce et al. |
| 5,876,675 | A | 3/1999 | Kennedy |
| 5,880,071 | A | 3/1999 | Parce et al. |
| 5,882,465 | A | 3/1999 | McReynolds |
| 5,885,470 | A | 3/1999 | Parce et al. |
| 5,932,100 | A | 8/1999 | Yager et al. |
| 5,942,443 | A | 8/1999 | Parce et al. |
| 5,948,227 | A | 9/1999 | Dubrow |
| 5,955,028 | A | 9/1999 | Chow |
| 5,958,694 | A | 9/1999 | Nikiforov |
| 5,959,291 | A | 9/1999 | Jensen |
| 5,965,410 | A | 10/1999 | Chow et al. |
| 5,976,336 | A | 11/1999 | Dubrow et al. |
| 5,989,402 | A | 11/1999 | Chow et al. |
| 6,001,229 | A | 12/1999 | Ramsey |
| 6,001,231 | A | 12/1999 | Kopf-Sill |
| 6,010,607 | A | 1/2000 | Ramsey |
| 6,012,902 | A | 1/2000 | Parce |
| 6,042,709 | A | 3/2000 | Parce et al. |
| 6,062,261 | A | 5/2000 | Jacobson et al. |
| 6,074,725 | A | 6/2000 | Kennedy |
| 6,100,541 | A | 8/2000 | Nagle et al. |
| 6,120,666 | A | 9/2000 | Jacobson et al. |
| 6,221,226 | B1 | 4/2001 | Kopf-Sill |
| 6,235,471 | B1 | 5/2001 | Knapp et al. |
| 6,280,589 | B1 | 8/2001 | Manz et al. |
| 6,416,642 | B1 | 7/2002 | Alajoki et al. |
| 6,458,259 | B1 | 10/2002 | Parce et al. |
| 6,729,352 | B2 * | 5/2004 | O'Connor et al. .......... 137/827 |

FOREIGN PATENT DOCUMENTS

| | | |
|---|---|---|
| WO | WO-9604547 | 2/1996 |
| WO | WO-9702357 | 1/1997 |
| WO | WO-0070080 | 11/2000 |

OTHER PUBLICATIONS

Effenhauser, C.S. et al., "Glass Chips for High-Speed Capillary Electrophoresis Separations with Submicrometer Plate Heights," *Anal. Chem.* (1993) 65: 2637-2642.

Effenhauser, C.S. et al., "High Speed Separation of Antisense Oligonucleotides on a Micromachined Capillary Electrophoresis Device," *Anal. Chem.* (1994) 66: 2949-2958.

Effenhauser, C.S. et al., "Integrated Capillary Electrophoresis on Flexible Silicone Microdevices: Analysis of DNA Restriction Fragments and Detection of Single DNA Molecules on Microchips," *Anal. Chem.* (1997) 69: 3451-3457.

Fan, Z.H. et al., "Micromachining of Capillary Electrophoresis Injectors and Separators on Glass Chips and Evaluation of Flow at Capillary Intersections," *Anal. Chem.* (1994) 66: 177-184.

Fister, J.C. III et al., "Counting Single Chromophore Molecules for Ultrasensitive Analysis and Separations on Microchip Devices," *Anal. Chem.* (1998) 70: 431-437.

Hadd, A.G. et al., "Microfluidic Assays of Acetylcholinesterase," *Anal. Chem.* (1999) 71:5206-5212.

Harrison, J. et al., "Capillary Electrophoresis and Sample Injection Systems Integrated on a Planar Glass Chip," *Anal. Chem.* (1992) 64: 1926-1932.

Harrison, J. et al., "Towards Miniaturized Electrophoresis and Chemical Analysis Systems on Silicon: An Alternative to Chemical Sensors*," *Sensors and Actuators B* (1993) 10: 107-116.

Harrison, J. et al., "Micromachining a Miniaturized Capillary Electrophoresis-Based Chemical Analysis System on a Chip," *Science* (1993) 261: 895-897.

Harrison, D.J. et al., "Integrated Eletrophoresis Systems for Biochemical Analyses," *Solid-State Sensor and Actuator Workshop* (1994) 21-24.

Jacobson, S.C. et al., "Effects of Injection Schemes and Column Geometry on the Performance of Microchip Electrophoresis Devices," *Anal. Chem.* (1994) 66:1107-1113.

Jacobson, S.C. et al., "High-Speed Separations on a Microchip," *Anal. Chem.* (1994) 66: 1114-1118.

Jacobson, S.C. et al., "Open Channel Electrochromatography on a Microchip," *Anal. Chem.* (1994) 66: 2369-2373.

Jacobson, S.C. et al., "Precolumn Reactions with Electrophoretic Analysis Integrated on a Microchip," *Anal. Chem.* (1994) 66: 4127-4132.

Jacobson, S.C. et al., "Microchip Electrophoresis with Sample Stacking," *Electrophoresis* (1995) 16: 481-486.

Jacobson, S.C. et al., "Fused Quartz Substrates for Microchip Electrophoresis," *Anal. Chem.* (1995) 67: 2059-2063.

Jacobson, S.C. et al., "Integrated Microdevice for DNA Restriction Fragment Analysis," *Anal. Chem.* (1996) 68: 720-723.

Jacobson, S.C. et al., "Electrokinetic Focusing in Microfabricated Channel Structures," *Anal. Chem.* (1997) 69: 3212-3217.

Jacobson, S.C. et al., "Microfluidic Devices for Electrokinetically Driven Parallel and Serial Mixing," *Anal. Chem.* (1999) 71: 4455-4459.

Kopp, M. et al., "Chemical amplification: continuous-flow PCR on a chip" *Science* (1998) 280:1046-1048.

Manz, A. et al., "Miniaturized Total Chemical Analysis Systems: a Novel Concept for Chemical Sensing," *Sensors and Actuators* (1990) B1: 244-248.

Manz, A. et al., "Micromachining of Monocrystalline Silicon and Glass for Chemical Analysis Systems," *Trends in Analytical Chemistry* (1991) 10:144-149.

Manz, A. et al., "Planar Chips Technology for Miniaturization and Integration of Separation Techniques into Monitoring Systems," *Journal of Chromatography* (1992) 593:253-258.

Manz, A. et al., "Planar Chips Technology for Miniaturization of Separation Systems: A Developing Perspective in Chemical Monitoring,".

Manz, A. et al., "Electroosmotic Pumping and Electrophoretic Separations for Miniaturized Chemical Analysis Systems," J. Micromach. Microeng. (1994) 4: 257-265.

Manz, A. et al., "Parallel Capillaries for High Throughput in Electrophoretic Separations and Electroosmotic Drug Discovery Systems," International Conference on Solid-State Sensors and Actuators (1997) 915-918.

McCormick, R.M. et al., "Microchannel Electrophoretic Separations of DNA in Injection-Molded Plastic Substrates," *Anal. Chem.* (1997) 69: 2626-2630.

Moore, A.W. et al., "Microchip Separations of Neutral Species via Micellar Electrokinetic Capillary Chromatography," *Anal. Chem.* (1995) 67: 4184-4189.

Ramsey, J.M. et al., "Microfabricated Chemical Measurements Systems," *Nature Medicine* (1995) 1:1093-1096.

Salimi-Moosavi, H. et al., "Biology Lab-on-a-Chip for Drug Screening," Solid-State Sensor and Actuator Workshop (1998) 350-353.

Seiler, K. et al., "Planar Glass Chips for Capillary Electrophoresis: Repetitive Sample Injection, Quantitation, and Separation Efficiency," *Anal. Chem.* (1993) 65:1481-1488.

Seiler, K. et al., "Electroosmotic Pumping and Valveless Control of Fluid Flow within a Manifold of Capillaries on a Glass Chip," *Anal. Chem.* (1994) 66:3485-3491.

Ueda, M. et al., "Imaging of a Band for DNA Fragment Migrating in Microchannel on Integrated Microchip," *Materials Science and Engineering C* (2000) 12:33-36.

Wang, C. et al., "Integration of Immobilized Trypsin Bead Beds for Protein Degestion within a Microfluidic Chip Incorporating Capillary Electrophoresis Separations and an Electrospray Mass Spectrometry Interface," *Rapid Commin. Mass Spectrom.* (2000) 14:1377-1383.

Woolley, A.T. et al., "Ultra-High-Speed DNA Fragment Separations Using Microfabricated Capillary Array Electrophoresis Chips," *Proc. Natl. Acad. Sci. USA* (1994) 91:11348-11352.

Woolley, A.T. et al., "Functional Integration of PCR Amplification and Capillary Electrophoresis in a Microfabricated DNA Analysis Device," Anal. Chem. (1996) 68: 4081-4086.

Woolley, A.T. et al., "High-Speed DNA Genotyping Using Microfabricated Capillary Array Electrophoresis Chips," *Anal. Chem.* (1997) 69:2181-2186.

Woolley, A.T. et al., "Capillary Electrophoresis Chips with Integrated Electrochemical Detection," *Anal. Chem.* (1998) 70: 684-688.

Zhang, B. et al., "Microfabricated Devices for Capillary Electrophoresis-Electrospray Mass Spectrometry," *Anal. Chem.* (1999) 71:3258-3264.

* cited by examiner

US 7,247,274 B1

PREVENTION OF PRECIPITATE BLOCKAGE IN MICROFLUIDIC CHANNELS

CROSS REFERENCE TO RELATED APPLICATIONS

This application claims the benefit of U.S. Provisional Patent Application No. 60/338,040, filed Nov. 13, 2001, which is incorporated herein by reference in its entirety for all purposes.

BACKGROUND OF THE INVENTION

When carrying out chemical or biochemical analyses, assays, syntheses or preparations, a large number of separate manipulations are performed on the material(s) or component(s) to be assayed, including measuring, aliquotting, transferring, diluting, mixing, separating, detecting, incubating, etc. Microfluidic technology miniaturizes these manipulations and integrates them so that they can be executed within one or a few microfluidic devices. For example, pioneering microfluidic methods of performing biological assays in microfluidic systems have been developed, such as those described by U.S. Pat. Nos. 5,942,443 and 6,235,471.

Of particular concern in numerous applications utilizing microfluidic devices is the dilution or mixing of, e.g., samples, reagents, analytes, etc. often within the small-scale microchannels comprising the device. Additionally, in many experimental/assay situations it is desirous to store biological or other molecules in storage solutions such as dimethyl sulfoxide (DMSO). However, because storage solutions, such as DMSO, can adversely affect certain types of assays, etc. and/or in order to present the molecule(s) in the storage solution (e.g., DMSO) in the correct concentration, such solution is typically diluted with other fluidic materials. Unfortunately, sudden diluting of some storage solutions (e.g., DMSO) can cause precipitates to come out of solution and possibly create a precipitate blockage of a microchannel or other microelement in the microfluidic device. Additionally, unwanted precipitate blockages can also arise through, e.g., precipitation of salts, proteins, etc. due to, e.g., changes in reaction conditions (such as temperature, concentration, pH, etc.) in the microfluidic elements. Because of the possibly extremely small scale diameters of the microfluidic elements in microfluidic devices, even small amounts of precipitate can achieve either total or partial blockage of microfluidic elements. Of course, such blockages can adversely impact flow through the microfluidic elements and thus adversely impact the assays, etc. being carried out in the microfluidic device. Furthermore, partial and/or complete blockages can, in some applications, adversely effect sample plug shape (e.g., width) etc. This is especially true in high throughput systems where even small interferences can severely decrease throughput efficiency.

A welcome addition to the art would be the ability to prevent or decrease the formation of blockages in microfluidic elements due to precipitation (especially due to that of DMSO). The current invention describes and provides these and other features by providing new methods, microchannels, and microfluidic devices that meet these and other goals.

SUMMARY OF THE INVENTION

The present invention provides methods, systems, kits, and devices for reducing, preventing or ameliorating precipitate blockages in microfluidic channels in microfluidic devices. Molecules, fluids, fluidic materials, etc. are flowed through specifically configured microfluidic elements (e.g., microchannels) in a microfluidic device. The specifically configured microfluidic elements comprise areas of enlarged cross-sectional geometry at the intersection of microfluidic elements, specifically arranged/intersected microchannels, allowing gradual/controlled dilution of precipitatable and/or precipitate inducing materials. The systems of the invention optionally also include features for applying an AC electric field orthogonal to the direction of fluid flow in the microchannels and/or microchannels structurally configured to permit application of an AC electric field orthogonal to the direction of fluid flow in a microchannel.

In one aspect, methods of preventing or ameliorating formation of precipitate blockages in a microfluidic element are provided. The methods comprise: flowing a first fluidic material through a first microchannel which channel comprises a first region and one more second region (which is downstream from the first region and is of greater cross-sectional area than the first or third region) and one or more third region (which is downstream from both the first region and the second region); flowing at least a second fluidic material through a second microchannel and into the second region of the first microchannel; and flowing the mixture of the first and second fluidic materials (and any precipitate) into the third region of the microchannel. In some embodiments, the cross-sectional area of the second region of the first microchannel is at least 2 times, at least 5 times, at least 10 times, at least 15 times, or at least 20 times or more greater in cross-sectional area than the first or third regions of the first microchannel. In yet other embodiments the cross-sectional area of the second region is great enough to prevent or ameliorate precipitate blockage of the microchannel by precipitate. In some embodiments, the second fluidic material comprises a buffer or water. Furthermore, other embodiments comprise applying an AC electric field orthogonal to the direction of fluid flow in the first microchannel.

In another aspect, the current invention comprises methods of reducing precipitate blockage in a microfluidic channel, comprising: flowing a first fluidic material into at least a first microchannel; flowing a selected amount of a second fluidic material into the first microchannel from at least a second microchannel (thus, diluting the first fluidic material and producing a precipitate at a concentration which permits flow of the fluidic materials and any precipitate through the first microchannel). In some embodiments, the first fluidic material comprises DMSO, and the second fluidic material comprises a buffer or water. In other embodiments, the first fluidic material is diluted by a select amount of the second fluidic material so as to dilute the first fluidic material by at least about 2-fold, at least about 3-fold, at least about 4-fold, or at least about 5-fold or more. In other embodiments the dilution of the first fluidic material is repeated (in either equal increments or in unequal increments) until a selected percent dilution of the first fluidic material is achieved. Additionally, the area of the first microchannel where the second fluidic material enters to dilute the first fluidic material is optionally of greater cross-sectional area than the areas both upstream and downstream of such enlarged area. Furthermore, other embodiments comprise wherein an AC electric field is applied orthogonal to the direction of fluid flow in the first microchannel.

In another aspect, the invention includes devices that are structurally configured to reduce precipitate blockage in microfluidic channels of the devices, such devices comprising: a first microchannel with a first region, a downstream second region which is greater in cross-sectional area than the first or third regions, and a third region that is downstream of both the first and second regions; at least a second microchannel fluidly coupled with the second region of the first microchannel; a source of a first fluidic material fluidly coupled to the first microchannel; a source of a second fluidic material fluidly coupled to the second microchannel and which material will form or cause a precipitate when mixed with the first fluidic material; a fluid direction system that controllably moves the fluidic materials through the microchannels in such a way that any precipitate formed or accumulated is present at a concentration or amount small enough not to inhibit flow of fluidic materials through the microchannels of the device. In some embodiments, the first fluidic material comprises DMSO and the second fluidic material comprises buffer or water. In other embodiments, the second region of the first microchannel is at least 2 times, at least 5 times, at least 10 times, at least 15 times, or at least 20 times or more greater in cross-sectional area than the first or third region of the first microchannel. In yet other embodiments, the cross-sectional area of the second region is great enough to prevent precipitate blockage of the microchannel. Furthermore, other embodiments include features for applying an AC electric field orthogonal to the direction of fluid flow in the first microchannel and/or structurally configured microchannels that permit application of an AC electric field orthogonal to the direction of fluid flow in the microchannel.

In another aspect, the invention includes devices that are structurally configured to reduce precipitate blockage in microfluidic channels of the devices, such devices comprising: a first microchannel; at least a second microchannel fluidly coupled to the first microchannel; a source of a first fluidic material coupled to the first microchannel; a source of a second fluidic material coupled to the second microchannel; and a fluid direction system that controllably moves a selected amount of the second fluidic material from the second microchannel into the first microchannel, thereby, producing a precipitate at a concentration which still permits flow of the precipitate and the fluidic materials through the first microchannel. Optionally, the device also comprises features for applying an AC electric field orthogonal to the direction of fluid flow in the first microchannel.

In some embodiments, the first fluidic material comprises DMSO and the second fluidic material comprises buffer or water. In various embodiments, the fluid direction system directs dilution of the first fluidic material by the second fluidic material by at least 2-fold, at least 3-fold, at least 4-fold, at least 5-fold or more greater than first fluidic material. In other embodiments, the fluid direction system directs multiple additions (optionally wherein the additions are of equal or unequal volume or wherein the first fluidic material or combination of first and second fluidic materials are diluted in equal or unequal percentages each time) of the second fluidic material to the first fluidic material or to a mixture of the first and second fluidic materials. In yet other embodiments, the first microchannel comprises a first region upstream of one or more second region which is greater in cross-sectional area than the first or third region and which is upstream of the one or more third region.

DETAILED DISCUSSION OF THE INVENTION

Figure 1A:
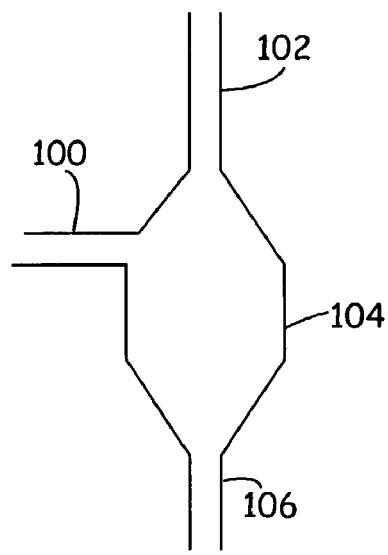
FIG. 1, panels A and B are schematic views of a specifically configured cross-sectional microchannel region and of specifically arranged microchannels used to prevent/ameliorate formation of precipitate blockages.

The methods and devices of the current invention directly address and solve problems associated with control and manipulation of fluidic material in microfluidic devices, especially dilution, mixing or transport of fluidic materials comprising precipitatable material, such as DMSO, or material comprising precipitate. Briefly, the invention provides devices and methods for: altering microchannel cross-sectional geometry in order to prevent formation of precipitate blockage of, e.g., microchannels; control of mixing together of fluidic materials (of either different types or of similar types) to, e.g., dilute a fluidic material in a manner which prevents/ameliorates formation of precipitate blockages of the microelements of the microfluidic device; applying an AC electric field orthogonal to the direction of fluid flow to help prevent/reduce precipitate sticking to the walls of the microchannel. As used herein, the term "cross-sectional geometry," "channel geometry," "cross-sectional configuration," etc. is to be understood to optionally include the dimension/size of the microchannel region (i.e., of the elements of the channel such as height, depth, wall curvature, etc.) as well as the layout/pattern of the microchannel region (i.e., the arrangement of the elements of the channel such as wall height, curvature, placement of any troughs/ridges/etc.). In other words, either or both of: the dimension/size of a microchannel region (or its elements) or the layout/pattern of a microchannel region (i.e., of its elements) are included within its "cross-sectional geometry" and are manipulated herein in order to prevent/ameliorate formation of precipitate blockages.

The methods and devices of the current invention used to control and manipulate transport/dilution/mixing of fluidic materials are flexible and can be utilized in many different embodiments of microfluidic devices which perform myriad assays, tasks, etc. The methods and devices herein can be utilized in microfluidic devices to, e.g., maximize throughput time, when such is applicable to the assay(s) being performed. For example, the screening of large libraries (or extremely large libraries, etc) such as combinatorial libraries can be time consuming due to the aggregation of time requirements or delays caused by blockages in the microfluidic elements due to precipitation as a result of transport/diluting/mixing/reconstituting/etc. of samples. The combination of elements which constitute the methods and devices of the current invention cleverly allow for optimizing of throughput by decreasing or eliminating such precipitate blockage, thus substantially decreasing time requirements for assays in microfluidic devices. Furthermore, the methods and devices of the present invention allow prevention and/or amelioration of precipitate blockage in non-high throughput systems (in fact, in any and all microfluidic systems) thus substantially improving reliability and accuracy of the systems.

In numerous ways, the current invention differs from other previous, methods and devices used for transport/ mixing/diluting of fluidic materials in microfluidic devices in such a way as to prevent precipitate blockages. For example, the current invention utilizes, e.g., specific alterations of microchannel cross-sectional geometry to prevent/ameliorate formation of precipitate blockages in microfluidic channels. Additionally, the current invention utilizes differences in ratios of the various fluidic materials that are mixed together in the microfluidic devices, thus controlling the amount of any precipitation formed (e.g., creating sequential small amounts of precipitate which are not large enough to block the microfluidic elements and/or which are flowed through the microfluidic elements without causing a precipitate blockage). Furthermore, the current invention optionally utilizes the application of an AC electric current across a microchannel orthogonal to the direction of fluid flow to help prevent precipitate from adhering/sticking to the walls of the microchannel.

The use of these devices/methods, either in combination or alone, allows for adjustment and modification of transport/mixing/dilution of fluidic materials in order to, e.g., prevent/ameliorate precipitate blockages in numerous assay situations, etc. For example, by accounting for different amounts of precipitation created by different assays/buffers, etc. in different situations, e.g., due to temperature, flow speed, etc., the various aspects/embodiments of the current invention can be tailored to prevent/ameliorate any precipitate blockages.

The methods/devices of the current invention are applicable to numerous types of precipitation from myriad sources. For example, precipitate formation (which can lead to blockages of microchannels) can arise from changes in temperature within microfluidic elements (e.g., cooling down) or from a chemical reaction (e.g., an insoluble product formed), not just from dilutions, etc. Additionally, precipitation can arise from proteins, e.g., due to aggregation of denatured proteins, etc. Furthermore, precipitation can be present in biological samples assayed in a microchannel (e.g., crystals in urine, blood, environmental samples (e.g., water, etc.)).

The present invention also optionally includes various elements involved in, e.g., reconstitution of stored samples, temperature control, fluid transport mechanisms, detection and quantification of molecular interactions (e.g., fluorescence detectors), robotic devices for, e.g., positioning of components or devices involved, etc.

I. Methods and Devices of the Invention

Manipulation/control (e.g., transport/diluting/mixing, etc.) of molecules, compounds, etc. in microfluidic devices is often done within one or more microchannels (sometimes referred to herein as microfluidic channels) or microreservoirs, etc. The term "microfluidic", as used herein, refers to a device component, e.g., chamber, channel, reservoir, or the like, that includes at least one cross-sectional dimension, such as depth, width, length, diameter, etc. of from about 0.1 micrometer to about 500 micrometers. Examples of microfluidic devices are detailed in, e.g., U.S. Pat. Nos. 5,942,443 and 5,880,071, both of which are incorporated herein by reference for all purposes.

In general, microfluidic devices are planar in structure and are constructed from an aggregation of planar substrate layers wherein the fluidic elements, such as microchannels, etc., are defined by the interface of the various substrate layers. The microchannels, etc. are usually etched, embossed, molded, ablated or otherwise fabricated into a surface of a first substrate layer as grooves, depressions, or the like. A second substrate layer is subsequently overlaid on the first substrate layer and bonded to it in order to cover the grooves, etc. in the first layer, thus creating sealed fluidic components within the interior portion of the device. Optionally, either one or both substrate layer has microchannels devised within it. Such microchannels can be aligned once on top of another when the substrate layers are joined together. Additionally, such microchannels as are thus constructed can be symmetrical (i.e., the microchannel on the first substrate is the same shape as that of the microchannel on the second substrate thus forming a symmetrical microchannel when the two substrate layers are joined, or such microchannels can be asymmetrical (i.e., the microchannel on the first substrate is a different shape as that of the microchannel on the second substrate thus forming an asymmetrical channel when the two substrate layers are joined. Additionally, open-well elements can be formed by making perforations in one or more substrate layer which perforation optionally can correspond to depressed microreservoir, microchannel, etc. areas on the complementary layer. Such microfluidic elements (e.g., the above microchannels) can be used to construct the specific microchannel shapes and/or arrangements of the present invention which prevent/ameliorate precipitate blockage formation (see, descriptions herein).

Manufacturing of microscale elements into the surface of the substrates can be carried out through any number of microfabrication techniques that are well known in the art. For example, lithographic techniques are optionally employed in fabricating, e.g., glass, quartz or silicon substrates, using methods well known in the semiconductor manufacturing industries such as photolithographic etching, plasma etching or wet chemical etching. Alternatively, micromachining methods such as laser drilling, micromilling and the like are optionally employed. Similarly, for polymeric substrates, well known manufacturing techniques may also be used. These techniques include injection molding or stamp molding methods wherein large numbers of substrates are optionally produced using, e.g., rolling stamps to produce large sheets of microscale substrates or polymer microcasting techniques where the substrate is polymerized within a micromachined mold. Furthermore, various combinations of such techniques, as described above and others well known to those skilled in the art, are optionally combined to produce the microelements present in embodiments of the current invention (e.g., the specifically arranged and/or configured microchannels, etc. used to prevent/ameliorate precipitate blockages).

As stated above, the substrates used to construct the microfluidic devices of the invention are typically fabricated from any number of different materials, depending upon, e.g., the nature of the samples to be assayed, the specific reactions and/or interactions being assayed for, etc. Additionally, the choice of substrate material is optionally influenced by the type/amount of any expected precipitate. For example, if it is expected that a protein precipitate will form in a particular situation, then a substrate can be chosen which does not allow protein to adhere to it (such adherence would exacerbate any precipitate blockages formed). For some applications, the substrate can optionally comprise a solid non-porous material. For example, the substrate layers can be composed of, e.g., silica-based materials (such as glass, quartz, silicon, fused silica, or the like), polymeric materials or polymer coatings on materials (such as polymethylmethacrylate, polycarbonate, polytetrafluoroethylene, polyvinylchloride, polydimethylsiloxane, polysulfone, polystyrene, polymethylpentene, polypropylene, polyethylene, polyvinylidine fluoride, acrylonitrile-butadiene-styrene copolymer, parylene or the like), ceramic materials, metal materials, etc.

The surface of a substrate layer may be of the same material as the non-surface areas of the substrate or, alternatively, the surface may comprise a coating on the substrate base. Furthermore, if the surface is coated, the coating optionally can cover either the entire substrate base or can cover select subparts of the substrate base. In some optional embodiments of the present invention, areas within the microfluidic devices where it is expected that precipitate blockages will form (e.g., at intersections/junctions of microchannels) the substrate which comprises such microchannel is optionally coated with a material to, e.g., reduce surface adherence of any precipitate and which is different than the base substrate. For example, in the case of glass substrates, the surface of the glass of the base substrate may be treated to provide surface properties that are compatible and/or beneficial to one or more sample or reagent being used. Such treatments include derivatization of the glass surface, e.g., through silanization or the like, or through coating of the surface using, e.g., a thin layer of other material such as a polymeric or metallic material. Derivatization using, e.g., silane chemistry is well known to those of skill in the art and can be readily employed to add amine, aldehyde or other functional groups to the surface of the glass substrate, depending upon the desired surface properties. Further, in the case of metal substrates, metals that are not easily corroded under potentially high salt conditions, applied electric fields, and the like are optionally preferred.

Figure 2A:
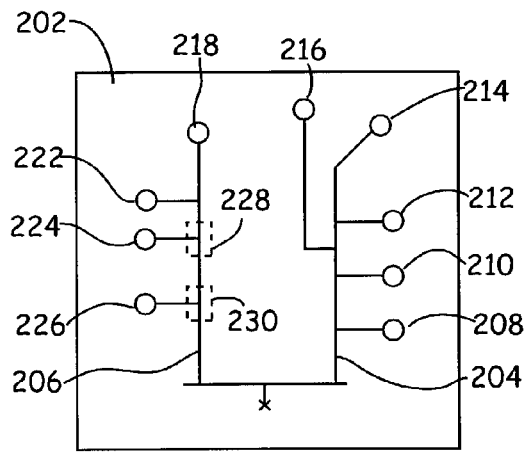
FIG. 2, panels A, B, and C are schematic views of optional embodiments of the invention comprising microchannels of specific geometry and arrangement.
Figure 2B:
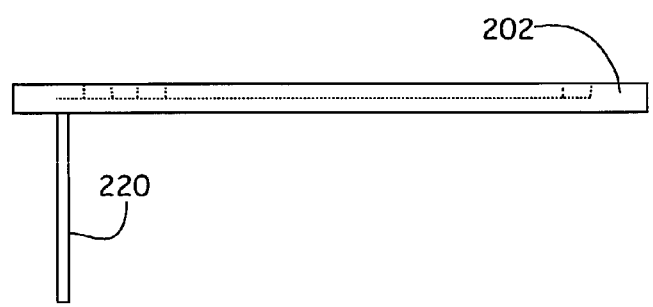
Figure 2C:
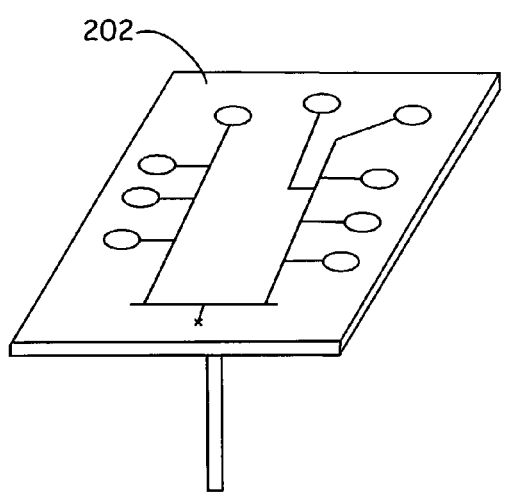

Although described in terms of a layered planar body structure, it will be appreciated that microfluidic devices in general and the present invention in particular can take a variety of forms, including aggregations of various fluidic components such as capillary tubes, individual chambers, arrangement of channel(s) etc., that are pieced together to provide the integrated elements of the complete device. For example, FIG. 2, panels A, B, and C, illustrates one of many possible arrangements of the elements of the present invention. In one such possible arrangement, as shown in FIG. 2, body structure 202 has main channels 204 and 206 disposed therein, which are fluidly connected to various reservoirs that can optionally contain, e.g., buffer, reagents, etc. Channel 204 as presented in FIG. 2 comprises a microchannel whose cross-sectional geometry has been specifically configured to prevent/minimize the formation of precipitate blockages in the microchannel. Channel 206 as presented in FIG. 2 comprises a microchannel which is specifically configured to intersect with other microchannels to gradually mix/dilute one or more fluidic material in such a way as to prevent/minimize the formation of precipitate blockages in the microchannel. Both channel 204 and channel 206 are optionally configured to allow an AC electric current orthogonal to the direction of fluid flow to help prevent/ ameliorate precipitate adhesion to the microchannel walls (see, below).

The microfluidic devices of the invention typically include at least one main channel (such as channel 204 or 206 in FIG. 2), where, e.g., analysis, separations, dilutions/mixing, etc. are performed, but may include two or more (or optionally, many more) main channels in order to multiplex the number of analyses being carried out in the microfluidic device at any given time. Typically, a single device will include from about 1 to about 100 or more separate main channels which main channel(s) are often ones specifically configured in cross-sectional areas and/or in arrangement of intersections with other microchannels and/or optionally with AC electric current delivered across the microchannel orthogonal to the direction of fluid flow, all to prevent or minimize formation of precipitate blockages.

In most cases, the main channel is intersected by at least one other microscale channel disposed within the body of the device. Typically, the one or more additional channels are used, e.g., to bring diluting fluidic materials, samples, test compounds, assay reagents, etc. into the main channel (e.g., 204 or 206), in order to carry out the desired assay, separation, etc. Additionally, the main channel can be intersected by one or more shunt microchannel as well. In the present invention, a dilution buffer is typically added into a main channel upstream of a shunt channel (see, description of FIG. 1, infra), so that the downstream increase in flow rate due to the addition of buffer material may be counteracted by the reduction in pressure due to the shunt channel. Reagent materials, on the other hand, are typically added downstream of a shunt channel so that they are added after the downstream flow rate in the main channel has been reduced so that smaller quantities of reagent are added. At many of the intersections of such channels with main channels, etc. the specific configurations/arrangements and/or AC currents are positioned so as to prevent/ameliorate precipitate blockages.

The reservoirs or wells of microfluidic devices incorporating the methods and devices of the current invention are locations at which samples, components, reagents and the like are added into the device for assays, etc. to take place. Introduction of these elements into the system is carried out as described herein. The reservoirs are typically placed so that the sample or reagent, etc. is added into the system upstream from the location at which it is used. For example, a dilution buffer is added upstream from the source of a reagent (e.g., a molecule stored in a concentrated form in a DMSO solution) if the reagent sample is to be diluted before reaction with the reagent. Alternatively, waste wells or reservoirs are used to store samples after a reaction or assay has been completed. The removal of the completed samples provides space in the channels to load and incubate other samples. In this fashion, the devices of the invention are optionally used in a high throughput manner. The throughput is maintained by continuously loading, incubating and unloading samples into and from the incubation channels of the device.

In these systems, a "capillary element" (a channel in which fluidic materials can be moved from a source to a microscale element) or other similar pipettor element is temporarily or permanently coupled to a source of fluidic material(s). The source of the fluidic material can be internal or external to the microfluidic device with the capillary element. Example sources include microwell plates, wells or reservoirs in the body of the microscale device itself, etc.

For example, the source of a cell type, sample, buffer, etc. can be a microwell plate external to the body structure of the microfluidic device, having at least one well with such fluidic material and/or buffer plug(s) to be drawn into the device within the microwell plate. Alternatively, the fluidic material source is a well or reservoir disposed on the surface or within the body of the structure of the microfluidic device; a container external to the body structure of the microfluidic device comprising at least one compartment comprising the fluidic material; or a solid phase structure comprising the fluidic material in lyophilized or otherwise dried form.

A. Illustrative Examples of Sample Microchannels which Prevent/Ameliorate Formation of Precipitate Blockage As stated above, the transport, dilution and/or mixing of fluidic materials in microfluidic devices can cause precipitation of various solutes out of solution. Additionally, precipitate in microfluidic devices can arise from, e.g., changes in temperature, formation of insoluble products, accumulation of inclusions/impurities from biological samples (e.g., blood, urine, environmental samples, etc.). Optional embodiments of the methods and devices of the present invention are equally applicable to prevention/amelioration of formation of precipitate blockages caused through any of the above, or similar, causes. It will be appreciated that illustrations herein using DMSO precipitate (see, sic passim) are not limiting and that other microchannel blockages caused by other types of precipitate(s) are also optionally prevented/ameliorated by the invention.

Precipitation, whatever its cause, can lead to formation of precipitate blockages of the microfluidic elements of the system. Such blockages can be especially problematic given the extremely small diameters of the microfluidic elements involved. In other words, even small amounts of precipitate formation can lead to blockage of microfluidic elements and thus interfere with the assays, etc. being performed in the device.

The problem of possible precipitate blockage formation in microfluidic devices can affect numerous embodiments of microfluidic devices. For example, one common situation wherein precipitate blockages may arise involves biological molecules/compounds involved in assays, etc. which are stored in buffers/solutions that can either precipitate out of solution under various conditions (e.g., dimethyl sulfoxide (DMSO), but also including any other precipitatable solvent/buffer/etc.) and/or which can cause other molecules with which they come into contact with to precipitate out of solution. In order to present such molecules/compounds stored in such buffers/solutions in the proper concentration and/or to dilute the storage buffer/solution concentration to levels which will not interfere with assays, etc., the sample is often diluted (with, e.g., water, an appropriate buffer, etc.) Unfortunately, all-at-once dilution of such storage buffer/solutions can lead to precipitate formation (either of molecules in the storage buffer/solution, the molecule/compound, and/or of other fluidic materials present in the microchannel), which, in turn, can lead to formation of precipitate blockages in the microfluidic elements. Additionally, another common possible cause of formation of precipitate blockages in microchannels, which can be ameliorated/prevented by the materials and methods of the current invention arises from precipitation of protein due to, e.g., mixing of organic buffers with lipid proteins in micellar buffer in order to break up micelles; mixing of low pH buffers with some proteins; extremes in temperature, etc.

The present invention cleverly allows for preventing and/or ameliorating precipitate blockages (no matter their origin or cause) in the microfluidic elements while, e.g., mixing/diluting/transporting fluidic materials. In some embodiments of the present invention, the cross-sectional geometry of a region of a first microfluidic element (e.g., a microchannel) is enlarged (relative to other regions of the same microfluidic element) at a location where a second microchannel intersects the first microchannel (see, e.g., FIG. 1a). In other embodiments of the present invention the configuration of numerous microchannels and the flow and concentration of fluidic materials within such microchannels is configured so that a fluidic material in one or more main microchannel is gradually diluted/mixed, thereby only gradually producing any precipitate (or, alternatively, not producing any precipitate) so that no blockage is formed (see, e.g., FIG. 1b). In yet other embodiments of the invention, enlarged cross-sectional areas of microchannel are incorporated into the configuration of numerous intersecting microchannels used to gradually dilute/mix fluidic materials, at junctures where the microchannels meet/intersect/etc. In still other embodiments of the invention, an AC electric current is applied orthogonal to the direction of fluid flow at areas/regions where precipitate blockages may occur (see, e.g., FIGS. 4 and 5) to help prevent precipitate from adhering to microchannel walls. In yet other embodiments, an oscillatory pressure flow is optionally applied to accomplish the same result as the AC current.

As used herein, some microchannel regions are described as "configured," "specifically configured," etc. Such channels can comprise a myriad of channel shapes depending upon the specific precipitate conditions involved. For example, a non-limiting example of a specifically configured microchannel is shown in FIG. 1a. Again, depending upon the specific parameters involved (e.g., the amount and/or type of precipitate present/produced, the fluidic materials involved, the concentration of various solutes, the temperature of all components, the flow speed of the fluidic materials, etc.) the cross-sectional geometry of specifically configured microchannel regions varies in different embodiments of the current invention and FIG. 1a represents only one of many possible configurations. For example, as shown in FIG. 1a, enlarged area, 104, can be of varying cross-sectional diameter, can be of varying length, and of varying wall slope/curvature (i.e., the area between, e.g., channel 102 and the full width of area 104 can be of varying degree). Such parameters are optionally modified depending upon, e.g., the amount and/or type of precipitate present/produced, etc.

As shown in FIG. 1a, the enlarged area of the microchannel (e.g., region 104) is located at a juncture of two microchannels (i.e., where one microchannel crosses or empties into another microchannel) such as 100 and 102. Formation of precipitate blockages at intersections of microchannels which do not incorporate aspects of the current invention (e.g., specifically configured and/or arranged microchannel, use AC current orthogonal to fluid flow, etc.), can arise for a number of reasons, such as, changes in concentration of material, formation of insoluble product(s), accumulation of contaminants (e.g., from assayed biological components such as blood, urine, etc.). However, in the current invention, enlarged cross-sectional area 104 prevents/ameliorates the formation of any precipitate blockage at the intersection of channels 100 and 102 by presenting a comparatively wider/larger cross-sectional area, thus allowing a greater area for fluidic materials to interact and thus producing/presenting a less concentrated precipitate formation or accumulation over a greater area as well. Such enlarged area prevents any precipitate from being in a large enough amount at any one point to block the microchannel and thus any precipitate accumulated and/or formed continues to flow through the microchannel (e.g., into microchannel region 106).

Figure 1B:
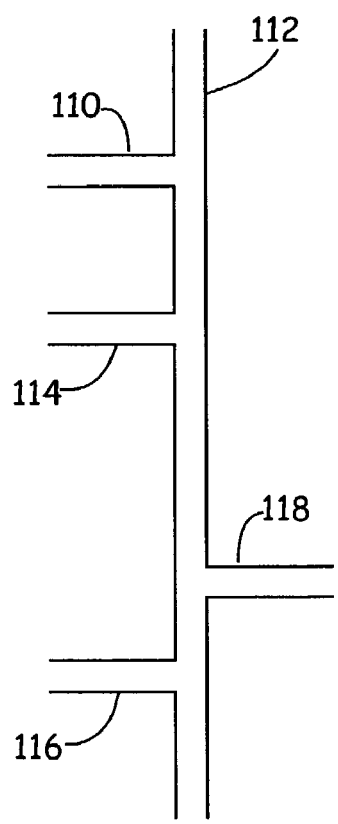

In other embodiments of the current invention, formation of precipitate blockages is prevented/ameliorated by specific arrangements of microchannels and specific arrangements of fluidic mixing. Such arrangements of microchannels are, e.g., used to dilute a fluidic material(s) capable of precipitation, in a specific fashion so as to form relatively small amounts of precipitate at one time. The precipitation can arise from, e.g., a material coming out of solution (e.g., DMSO) or from, e.g., the formation of an insoluble product, etc. (see, above). FIG. 1b illustrates a specific arrangement of microchannels (and, also, a specific arrangement of dilution/addition of fluidic material) designed to prevent/ameliorate the formation of precipitate blockage of the microchannels. It is to be appreciated, of course, that the arrangement shown in FIG. 1b is non-limiting, and that myriad other channel/dilution arrangements (e.g., including different arrangements of microchannels and different percentage mixtures of similar and/or different fluidic materials) are included in the current invention depending upon the specific needs of the reactions/fluidic materials/etc. involved.

As a non-limiting illustration, and as shown in FIG. 1b, a first fluidic material (e.g., one comprising DMSO in this illustration, but also including any other fluidic material capable of precipitating and/or causing precipitation) is flowed through microchannel 112 (e.g., by electrokinetic or other means) with a desired final concentration of, e.g., 1:100 DMSO. A second fluidic material (e.g., a diluent) is flowed into channel 112 from microchannel 110. For example, the first fluidic material is optionally a biological sample (e.g., an enzyme) in a DMSO solution, while the second fluidic material is optionally, e.g., water or a buffer specific for such an enzyme. Instead of doing an immediate 1:100 dilution at the intersection of microchannels 112 and 110 which would produce all the possible precipitation at the point of intersection and which could possible create a precipitate blockage, the current invention cleverly dilutes the first fluidic material in steps, thus producing smaller amounts of precipitation in each individual dilution/mixing event. Such smaller amounts of precipitation are not large enough to block the microchannels (i.e., they are not large enough by themselves to form a precipitate blockage).

To achieve the 1:100 dilution in the non-limiting illustration, the second fluidic material (i.e., the water, etc.) above is optionally used to dilute the first fluidic material (i.e., the DMSO+enzyme) in a 1:1 ratio at the confluence of 112 and 110 by flowing equal parts first fluidic material and second fluidic material together. Thus a 1:1 mixture is formed along with a certain quantity of precipitation, which quantity of precipitate is not large enough or great enough to create a precipitate blockage in channel 112 or in channel 110. Another aliquot of the second fluidic material (or, e.g., a third fluidic material) is flowed through microchannel 114 into channel 112, thus diluting the above-created 1:1 mixture in channel 112 by an 8:2 ratio (i.e., 8 parts second fluidic material (water) and 2 parts of the above-created 1:1 mixture). Again, the amount of precipitate formed by such a dilution is too small to create a precipitate blockage of either channel 112 or 114. As shown in FIG. 1b, channel 118, is used as a shunt channel to draw off an aliquot of fluidic material in channel 112, thus, reducing the total amount of fluidic material in the channel, but not changing the concentration of the fluidic materials in the microchannels. In the present example to create a final 1:100 dilution of the first fluidic material, 90% of the DMSO:water mixture in channel 112 is drawn off through channel 118, leaving behind the other 10% in channel 112. The final dilution to reach a 1:100 dilution of the DMSO is done by flowing an aliquot of the second fluidic material, here water (or, e.g., a third or fourth fluidic material), from channel 116 into channel 112 in a 9:1 ratio (i.e., 9 parts water to the remaining mixture in channel 112). Again, any precipitate produced by such a dilution/addition is too small to create a precipitate blockage of channel 112 or 116.

The final mixture in the non-limiting illustration of fluidic materials in channel 112 comprises a 1:100 dilution of the original first fluidic material (DMSO+enzyme) without the formation of precipitate blockages in any of the microchannels involved. This is to be contrasted with a 1:100 dilution done in one step (i.e., only one step involved in mixing the DMSO+enzyme with water) which could possibly form a precipitate blockage of the microchannel since all of the precipitate formed would be formed in one location (e.g., the intersection of 112 and 110). The arrangement of the various microchannels/dilutions in the above example can also comprise specific enlarged cross-sectional areas (e.g., as is shown in FIG. 1a) at locations where the microchannels intersect (e.g., where 112 intersects with 110).

The above example is non-limiting, and numerous other embodiments of the current invention are optionally varied in, e.g., arrangement of microchannels (e.g., staggered in order to keep any precipitate formed from building up in enough quantity to block the microchannel) and specific dilutions of the fluidic materials in the microchannels (e.g., the concentrations/aliquot amounts of the various fluidic materials are optionally altered depending upon, e.g., the amount of precipitate formed by the specific buffer, etc. being utilized). Additionally, as stated previously, the above embodiments of the invention are not limited by the type or source of precipitates involved (i.e., the embodiments are not limited to precipitation from DMSO solutions).

Figure 4:
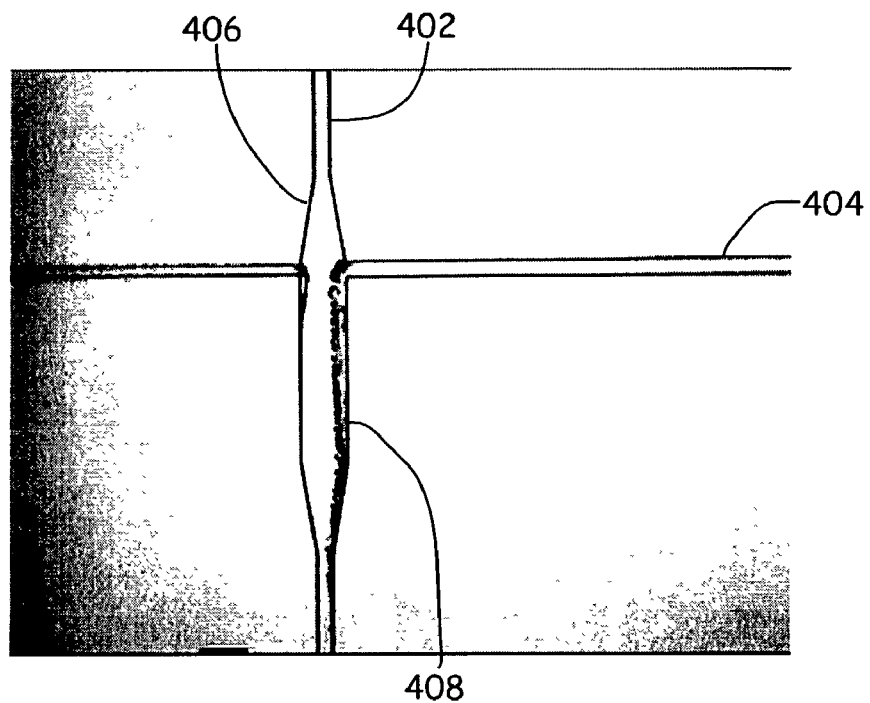
FIG. 4, is a view showing adherence of precipitated enzyme to the walls of a microchannel.

In other embodiment of the invention, precipitate blockages are prevented/ameliorated by application of an AC current orthogonal to the direction of fluid flow in a microchannel. The application of such AC current significantly reduces adherence of precipitate (e.g., precipitated proteins) to walls of the microchannel. Again, as with the other embodiments described herein, the embodiment is applicable to basically any type or source of precipitation which may act to form precipitate blockages within a microchannel. Furthermore, the use of AC current to reduce precipitate adherence to microchannel walls is readily and optionally incorporated into other embodiments of the invention. For example the specific microchannel configurations and arrangements described above are optionally constructed so that an AC current is applied orthogonal to the direction of fluidic flow. For example in FIG. 4, an enzyme solution flowing through microchannel 402 was mixed with a fluid flowing through microchannel 404, thus, forming a precipitate as is seen in FIG. 4, 408. It will be appreciated that, as in earlier descriptions, microchannel 402 enlarges into area 406 to help ameliorate/prevent blockage of channel 402 by precipitated enzyme. However, precipitated enzyme is seen adhering to the walls of microchannel region 406, 408.

Figure 5:
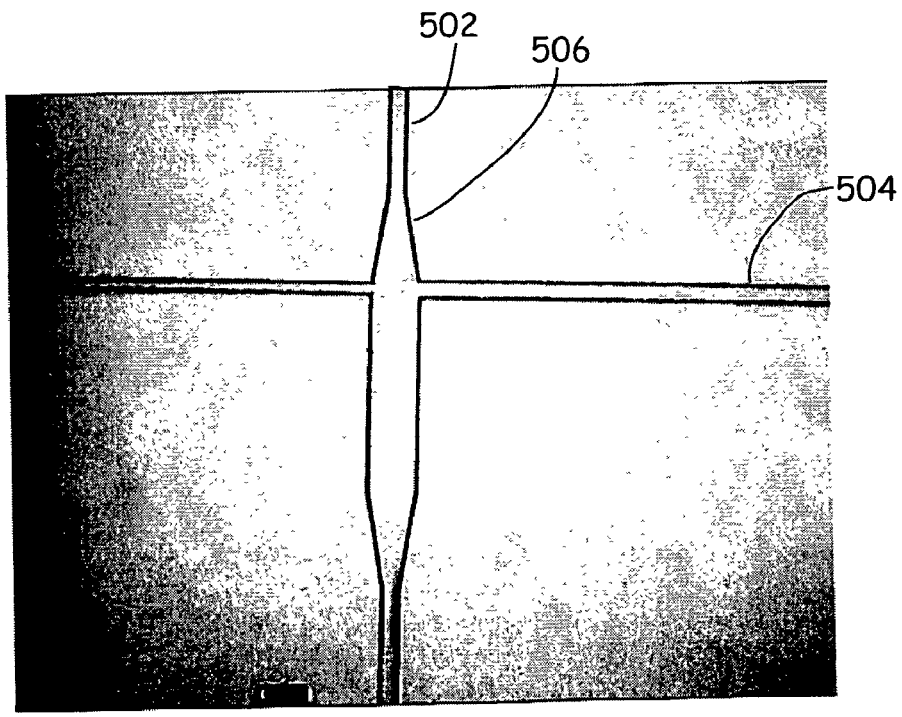
FIG. 5, is a view showing reduction of adherence of precipitated enzyme to the walls of a microchannel.

FIG. 5 illustrates the same mixing of enzyme solution as is shown in FIG. 4, but with an AC electric field applied through cross channel 504 (field is 5 Hz, 2800 v). As is shown in FIG. 5, the applied field significantly reduces adhesion of the precipitated enzyme to the walls of microchannel region 506.

Embodiments of the current invention which incorporate use of an AC field to reduce precipitate adherence can be applied/combined with any of the other embodiments described herein; are optionally used with numerous types of microfluidic chips as described in the references cited herein; and are applicable to microfluidic chips comprised of, e.g., glass, quartz, plastic, silicon, ceramic, etc. The precipitate which is prevented from adhering to the microchannel walls can be organic and/or inorganic and the fluid flow in the microchannel is optionally aqueous and/or organic.

Finally, in some embodiments, an oscillatory pressure flow is optionally employed to reduce precipitate adhesion to the walls of the microchannels.

The above examples illustrate that the methods and devices of the current invention are easily adaptable to many different experimental situations and, as stated previously, the elements (i.e., methods and devices) of the current invention can be incorporated into numerous microfluidic devices which perform any number of different assays, tasks, etc. Whenever a possibility of precipitate blockages occurs, the elements of the current invention can be combined and interlaced with the designs of other microfluidic chips and devices to help achieve proper (or more efficient) flow (i.e., by preventing/ameliorating precipitate blockages).

The various types of microfluidic devices, etc. that benefit from such systems and methods as are found within the present invention (i.e., ones into which the present methods/devices are optionally readily incorporated) are described in numerous publications by the inventors and their coworkers, all of which are incorporated herein by reference in their entirety for all purposes. These include certain issued U.S. patents, including U.S. Pat. No. 5,699,157 (J. Wallace Parce) issued Dec. 16, 1997, U.S. Pat. No. 5,779,868 (J. Wallace Parce et al.) issued Jul. 14, 1998, U.S. Pat. No. 5,800,690 (Calvin Y. H. Chow et al.) issued Sep. 1, 1998, U.S. Pat. No. 5,842,787 (Anne R. Kopf-Sill et al.) issued Dec. 1, 1998, U.S. Pat. No. 5,852,495 (J. Wallace Parce) issued Dec. 22, 1998, U.S. Pat. No. 5,869,004 (J. Wallace Parce et al.) issued Feb. 9, 1999, U.S. Pat. No. 5,876,675 (Colin B. Kennedy) issued Mar. 2, 1999, U.S. Pat. No. 5,880,071 (J. Wallace Parce et al.) issued Mar. 9, 1999, U.S. Pat. No. 5,882,465 (Richard J. McReynolds) issued Mar. 16, 1999, U.S. Pat. No. 5,885,470 (J. Wallace Parce et al.) issued Mar. 23, 1999, U.S. Pat. No. 5,942,443 (J. Wallace Parce et al.) issued Aug. 24, 1999, U.S. Pat. No. 5,948,227 (Robert S. Dubrow) issued Sep. 7, 1999, U.S. Pat. No. 5,955,028 (Calvin Y. H. Chow) issued Sep. 21, 1999, U.S. Pat. No. 5,957,579 (Anne R. Kopf-Sill et al.) issued Sep. 28, 1999, U.S. Pat. No. 5,958,203 (J. Wallace Parce et al.) issued Sep. 28, 1999, U.S. Pat. No. 5,958,694 (Theo T. Nikiforov) issued Sep. 28, 1999, U.S. Pat. No. 5,959,291 (Morten J. Jensen) issued Sep. 28, 1999, U.S. Pat. No. 5,964,995 (Theo T. Nikiforov et al.) issued Oct. 12, 1999, U.S. Pat. No. 5,965,001 (Calvin Y. H. Chow et al.) issued Oct. 12, 1999, U.S. Pat. No. 5,965,410 (Calvin Y. H. Chow et al.) issued Oct. 12, 1999, U.S. Pat. No. 5,972,187 (J. Wallace Parce et al.) issued Oct. 26, 1999, U.S. Pat. No. 5,976,336 (Robert S. Dubrow et al.) issued Nov. 2, 1999, U.S. Pat. No. 5,989,402 (Calvin Y. H. Chow et al.) issued Nov. 23, 1999, U.S. Pat. No. 6,001,231 (Anne R. Kopf-Sill) issued Dec. 14, 1999, U.S. Pat. No. 6,011,252 (Morten J. Jensen) issued Jan. 4, 2000, U.S. Pat. No. 6,012,902 (J. Wallace Parce) issued Jan. 11, 2000, U.S. Pat. No. 6,042,709 (J. Wallace Parce et al.) issued Mar. 28, 2000, U.S. Pat. No. 6,042,710 (Robert S. Dubrow) issued Mar. 28, 2000, U.S. Pat. No. 6,046,056 (J. Wallace Parce et al.) issued Apr. 4, 2000, U.S. Pat. No. 6,048,498 (Colin B. Kennedy) issued Apr. 11, 2000, U.S. Pat. No. 6,068,752 (Robert S. Dubrow et al.) issued May 30, 2000, U.S. Pat. No. 6,071,478 (Calvin Y. H. Chow) issued Jun. 6, 2000, U.S. Pat. No. 6,074,725 (Colin B. Kennedy) issued Jun. 13, 2000, U.S. Pat. No. 6,080,295 (J. Wallace Parce et al.) issued Jun. 27, 2000, U.S. Pat. No. 6,086,740 (Colin B. Kennedy) issued Jul. 11, 2000, U.S. Pat. No. 6,086,825 (Steven A. Sundberg et al.) issued Jul. 11, 2000, U.S. Pat. No. 6,090,251 (Steven A. Sundberg et al.) issued Jul. 18, 2000, U.S. Pat. No. 6,100,541 (Robert Nagle et al.) issued Aug. 8, 2000, U.S. Pat. No. 6,107,044 (Theo T. Nikiforov) issued Aug. 22, 2000, U.S. Pat. No. 6,123,798 (Khushroo Gandhi et al.) issued Sep. 26, 2000, U.S. Pat. No. 6,129,826 (Theo T. Nikiforov et al.) issued Oct. 10, 2000, U.S. Pat. No. 6,132,685 (Joseph E. Kersco et al.) issued Oct. 17, 2000, U.S. Pat. No. 6,148,508 (Jeffrey A. Wolk) issued Nov. 21, 2000, U.S. Pat. No. 6,149,787 (Andrea W. Chow et al.) issued Nov. 21, 2000, U.S. Pat. No. 6,149,870 (J. Wallace Parce et al.) issued Nov. 21, 2000, U.S. Pat. No. 6,150,119 (Anne R. Kopf-Sill et al.) issued Nov. 21, 2000, U.S. Pat. No. 6,150,180 (J. Wallace Parce et al.) issued Nov. 21, 2000, U.S. Pat. No. 6,153,073 (Robert S. Dubrow et al.) issued Nov. 28, 2000, U.S. Pat. No. 6,156,181 (J. Wallace Parce et al.) issued Dec. 5, 2000, U.S. Pat. No. 6,167,910 (Calvin Y. H. Chow) issued Jan. 2, 2001, U.S. Pat. No. 6,171,067 (J. Wallace Parce) issued Jan. 9, 2001, U.S. Pat. No. 6,171,850 (Robert Nagle et al.) issued Jan. 9, 2001, U.S. Pat. No. 6,172,353 (Morten J. Jensen) issued Jan. 9, 2001, U.S. Pat. No. 6,174,675 (Calvin Y. H. Chow et al.) issued Jan. 16, 2001, U.S. Pat. No. 6,182,733 (Richard J. McReynolds) issued Feb. 6, 2001, U.S. Pat. No. 6,186,660 (Anne R. Kopf-Sill et al.) issued Feb. 13, 2001, U.S. Pat. No. 6,221,226 (Anne R. Kopf-Sill) issued Apr. 24, 2001, U.S. Pat. No. 6,233,048 (J. Wallace Parce) issued May 15, 2001, U.S. Pat. No. 6,235,175 (Robert S. Dubrow et al.) issued May 22, 2001, U.S. Pat. No. 6,235,471 (Michael Knapp et al.) issued May 22, 2001, and U.S. Pat. No. 6,238,538 (J. Wallace Parce et al.) issued May 29, 2001.

These systems are also described in various PCT applications by the inventors including, e.g., WO 98/00231, WO 98/00705, WO 98/00707, WO 98/02728, WO 98/05424, WO 98/22811, WO 98/45481, WO 98/45929, WO 98/46438, and WO 98/49548, WO 98/55852, WO 98/56505, WO 98/56956, WO 99/00649, WO 99/10735, WO 99/12016, WO 99/16162, WO 99/19056, WO 99/19516, WO 99/29497, WO 99/31495, WO 99/34205, WO 99/43432, WO 99/44217, WO 99/56954, WO 99/64836, WO 99/64840, WO 99/64848, WO 99/67639, WO 00/07026, WO 00/09753, WO 00/10015, WO 00/21666, WO 00/22424, WO 00/26657, WO 00/42212, WO 00/43766, WO 00/45172, WO 00/46594, WO 00/50172, WO 00/50642, WO 00/58719, WO 00/60108, WO 00/70080, WO 00/70353, WO 00/72016, WO 00/73799, WO 00/78454, WO 01/02850, WO 01/14865, WO 01/17797, and WO 01/27253.

II. Integrated Systems, Methods and Microfluidic Devices of the Invention

The microfluidic devices of the invention include numerous optional embodiments including variant methods and devices for, e.g., fluid transport, temperature control, detection and the like.

As used herein, the term "microfluidic device" refers to a system or device having fluidic conduits or chambers that are generally fabricated at the micron to sub-micron scale, e.g., typically having at least one cross-sectional dimension in the range of from about 0.1 micrometer to about 500 micrometer. Dimensions of such minuteness emphasize the need for devices/methods, such as the current invention, to prevent and/or reduce precipitate blockage of microscale elements whether such is from, e.g., DMSO precipitate caused by dilution of a DMSO containing solution, by precipitation of molecules due to changes in temperature from any other cause of precipitation described herein, or from any source of precipitate, etc.

The microfluidic system of the current invention is fabricated from materials that are compatible with the conditions present in the specific experiments, etc. to be performed on the specific samples, reagents, etc. under examination, etc. Such conditions include, but are not limited to, pH, temperature, ionic concentration, pressure, and application of electrical fields. The materials of the device are also chosen for their inertness to components of the experiments to be carried out in the device, e.g., those experiments or assays in addition to the prevention/amelioration of precipitate blockages. Such materials include, but are not limited to, glass, quartz, silicon, and polymeric substrates, e.g., plastics, depending on the intended application.

Although the devices and systems specifically illustrated herein are generally described in terms of the performance of a few operations, or of one particular operation, it will be readily appreciated from this disclosure that the flexibility of these systems permits easy integration of the methods/devices of the invention into many different operations and of many additional operations into these current devices. For example, the devices and systems described will optionally include structures, reagents and systems for performing virtually any number of operations both upstream and downstream (as well as at the same location) from the operations specifically described herein (e.g., upstream and/or downstream of such preventions of precipitate blockages, etc. as described herein). Such upstream operations include, for example, sample handling and preparation, e.g., extraction, purification, amplification, cellular activation, labeling reactions, dilution, aliquotting, and the like. Similarly, downstream operations optionally include similar operations, including, e.g., further separation of sample components, labeling of components, assays and detection operations, electrokinetic or pressure-based injection of components or the like.

The microfluidic devices of the present invention can include features of microscale systems, such as fluid transport systems which direct particle/fluid movement within and to the microfluidic devices as well as the flow of fluids to and through various channels, dilution regions, etc. Various combinations of fluid flow mechanisms can be utilized in embodiments of the present invention. Additionally, various types of fluid flow mechanisms can be utilized in separate areas of microfluidic devices of the invention. For example, separation of fluidic materials can be carried out in some microchannels by utilizing non-electrokinetic fluid flow. While in other areas of the same microfluidic device electrokinetic fluid flow is optionally used. Flow of fluidic components such as reagents, etc., can incorporate any movement mechanism set forth herein (e.g., fluid pressure sources for modulating fluid pressure in microchannels/microreservoirs/etc.; electrokinetic controllers for modulating voltage or current in microchannels/microreservoirs/etc.; gravity flow modulators; magnetic control elements for modulating a magnetic field within the microfluidic device; use of hydrostatic, capillary, or wicking forces; or combinations thereof).

The microfluidic devices of the invention can also include fluid manipulation elements such as parallel stream fluidic converters, i.e., converters which facilitate conversion of at least one serial stream of reagents into parallel streams of reagents for parallel delivery to a reaction site or reaction sites within the device. The systems herein optionally include mechanisms such as valve manifolds and a plurality of solenoid valves to control flow switching, e.g., between channels and/or to control pressure/vacuum levels in the, e.g., microchannels. Additionally, molecules, reagents, etc. are optionally loaded into one or more channels of a microfluidic device through one sipper capillary fluidly coupled to each of one or more channels and to a sample or particle source, such as a microwell plate.

In the present invention, materials such as cells, proteins, antibodies, enzymes, substrates, buffers, precipitates (e.g., DMSO precipitate or any other type/kind of precipitate) or the like are optionally monitored and/or detected, e.g., so that the presence of a precipitate blockage can be detected, levels of any precipitate formed can be monitored, the presence of a component of interest can be detected, an activity of a compound can be determined, separation of fluidic materials can be monitored, or an effect of a modulator, e.g., on an enzyme's activity, can be measured. Depending upon the detected signal measurements, decisions are optionally made regarding subsequent fluidic operations, e.g., whether to change/modify dilution speeds and/or ratios to minimize further precipitate formation in an area, whether to assay a particular component in detail to determine, e.g., kinetic information or, e.g., whether, when, or to what extent to shunt a portion of a fluidic material from a main channel into a second channel (e.g., flowing a fluidic material into a second channel) once it has been separated from a mixture of fluidic materials.

In brief, the systems described herein optionally include microfluidic devices, as described above, in conjunction with additional instrumentation for controlling fluid transport, flow rate and direction within the devices, detection instrumentation for detecting or sensing results of the operations performed by the system and/or presence/absence/degree of precipitate blockage, processors, e.g., computers, for instructing the controlling instrumentation in accordance with preprogrammed instructions, receiving data from the detection instrumentation, and for analyzing, storing and interpreting the data, and providing the data and interpretations in a readily accessible reporting format. For example, the systems herein optionally include a valve manifold and a plurality of solenoid valves to control flow switching between channels and/or to control pressure/vacuum levels in the channels.

A. Temperature Control

Various embodiments of the present invention can control temperatures to influence numerous parameters or reaction conditions, e.g., those in thermocycling reactions (e.g., PCR, LCR). Additionally, the present invention can control temperatures in order to manipulate reagent properties, etc. (for example, buffers, etc. are optionally heated to help prevent or reduce precipitate formation in the microscale elements of the current devices). However, in some assays/etc. necessary and/or unavoidable changes in temperature can lead to precipitate formation and thus to precipitate blockages. In general, and in optional embodiments of the invention, various heating methods can be used to provide a controlled temperature in the involved miniaturized fluidic systems. Such heating methods include both joule and non-joule heating.

Non-joule heating methods can be internal, i.e., integrated into the structure of the microfluidic device, or external, i.e., separate from the microfluidic device. Non-joule heat sources can include, e.g., photon beams, fluid jets, liquid jets, lasers, electromagnetic fields, gas jets, electron beams, thermoelectric heaters, water baths, furnaces, resistive thin films, resistive heating coils, peltier heaters, or other materials, which provide heat to the fluidic system in a conductive manner. Such conductive heating elements transfer thermal energy from, e.g., a resistive element in the heating element to the microfluidic system by way of conduction. Thermal energy provided to the microfluidic system overall, increases the temperature of the microfluidic system to a desired temperature. Accordingly, the fluid temperature and the temperature of the molecules and/or precipitates within, e.g., the microchannels of the system, are also increased in temperature. An internal controller in the heating element or within the microfluidic device optionally can be used to regulate the temperature involved. These examples are not limiting and numerous other energy sources can be utilized to raise the fluid temperature in the microfluidic device.

Non-joule heating units can attach directly to an external portion of a chip of the microfluidic device. Alternatively, non-joule heating units can be integrated into the structure of the microfluidic device. In either case, the non-joule heating is optionally applied to only selected portions of chips in microfluidic devices (e.g., such as reaction areas, dilution areas, detection areas, junctions/intersections of microchannels or any area where precipitate may form and/or accumulate, etc.) or optionally heats the entire chip of the microfluidic device and provides a uniform temperature distribution throughout the chip A variety of methods can be used to lower fluid temperature in the microfluidic system, through use of energy sinks. Such an energy sink can be a thermal sink or a chemical sink and can be flood, time-varying, spatially varying, or continuous. A thermal sink can include, among others, a fluid jet, a liquid jet, a gas jet, a cryogenic fluid, a super-cooled liquid, or a thermoelectric cooling means, e.g., peltier device.

In general, electric current passing through the fluid in a channel produces heat by dissipating energy through the electrical resistance of the fluid. Power dissipates as the current passes through the fluid and goes into the fluid as energy as a function of time to heat the fluid. The following mathematical expression generally describes a relationship between power, electrical current, and fluid resistance: where POWER=power dissipated in fluid: I=electric current passing through fluid; and R=electric resistance of fluid.

$$POWER=I^2R$$

The above equation provides a relationship between power dissipated ("POWER") to current ("I") and resistance ("R"). In some of the embodiments of the invention, wherein electric current is directed toward moving a fluid, a portion of the power goes into kinetic energy of moving the fluid through the channel. Joule heating uses a selected portion of the power to heat the fluid in the channel or a selected channel region(s) of the microfluidic device and can utilize in-channel electrodes. See, e.g., U.S. Pat. No. 5,965,410, which is incorporated herein by reference in its entirety for all purposes. Such a channel region is often narrower or smaller in cross section than other channel regions in the channel structure. The small cross section provides higher resistance in the fluid, which increases the temperature of the fluid as electric current passes therethrough. Alternatively, the electric current can be increased along the length of the channel by increased voltage, which also increases the amount of power dissipated into the fluid to correspondingly increase fluid temperature.

Joule heating permits the precise regional control of temperature and/or heating within separate microfluidic elements of the device of the invention, e.g., within one or several separate channels or within areas where precipitate may form and/or accumulate, without heating other regions where such heating is, e.g., unnecessary or undesirable. Because the microfluidic elements involved are extremely small in comparison to the mass of the entire microfluidic device in which they are fabricated, such heat remains substantially localized, e.g., it dissipates into and from the device before it affects other fluidic elements. In other words, the relatively massive device functions as a heat sink for the separate fluidic elements contained therein.

To selectively control the temperature of fluid or material of a region of, e.g., a microchannel, the joule heating power supply of the invention can apply voltage and/or current in several optional ways. For instance, the power supply optionally applies direct current (i.e., DC), which passes through one region of a microchannel and into another region of the same microchannel which is smaller in cross section in order to heat fluid and material in the second region. This direct current can be selectively adjusted in magnitude to complement any voltage or electric field applied between the regions to move materials in and out of the respective regions. In order to heat the material within a region, without adversely affecting the movement of a material, alternating current (i.e., AC) can be selectively applied by a power supply. The AC used to heat the fluid can be selectively adjusted to complement any voltage or electric field applied between regions in order to move fluid into and out of various regions of the device. Alternating current, voltage, and/or frequency can be adjusted, for example, to heat a fluid without substantially moving the fluid. Alternatively, the power supply can apply a pulse or impulse of current and/or voltage, which will pass through one microchannel region and into another microchannel region to heat the fluid in the region at a given instance in time. This pulse can be selectively adjusted to complement any voltage or electric field applied between the regions in order to move materials, e.g., fluids or other materials, into and out of the various regions. Pulse width, shape, and/or intensity can be adjusted, for example, to heat a fluid substantially without moving the fluid or any materials within the fluid, or to heat the material(s) while moving the fluid or materials. Still further, the power supply optionally applies any combination of DC, AC, and pulse, depending upon the application. The microchannel(s) itself optionally has a desired cross section (e.g., diameter, width or depth) that enhances the heating effects of the current passed through it and the thermal transfer of energy from the current to the fluid (e.g., in addition to, or alternative to, any cross-sectional geometry used to manipulate/influence precipitate formation/blockage etc.). Additionally, as described above, AC current is optionally used in one or more area of the current invention to help prevent/ameliorate adhesion of precipitate to microchannel walls. This is in addition to, or alternative to, any other use of AC power in the invention.

Because electrical energy is optionally used to control temperature directly within the fluids contained in the microfluidic devices, the methods and devices of the invention are optionally utilized in microfluidic systems which employ electrokinetic material transport systems, as noted herein. Specifically, the same electrical controllers, power supplies and electrodes can be readily used to control temperature contemporaneously with their control of material transport. See, infra. In some embodiments of the invention, the device provides multiple temperature zones by use of zone heating. On such example apparatus is described in Kopp, M. et al. (1998) "Chemical amplification: continuous-flow PCR on a chip" *Science* 280(5366): 1046–1048.

As can be seen from the above, the elements of the current invention can be configured in many different arrangements depending upon the specific needs of the molecules, etc. under consideration and the parameters of the specific assays/reactions involved. Again, the above non-limiting illustrations are only examples of the many different configurations/embodiments of the invention.

B. Fluid Flow

A variety of controlling instrumentation and methodology is optionally utilized in conjunction with the microfluidic devices described herein, for controlling the transport and direction of fluidic materials and/or materials within the devices of the present invention by, e.g., pressure-based or electrokinetic control, etc.

In the present system, the fluid direction system controls the transport, flow and/or movement of samples, other reagents, etc. into and through the microfluidic device. For example, the fluid direction system optionally directs the movement of one or more fluid (e.g., samples suspended in a DMSO solution) etc. into, e.g., a microchannel where such fluidic materials, e.g., are to be separated or are to be kept together in a "plug." The fluid direction system also optionally directs the simultaneous or sequential movement of fluidic materials into one or more channels, etc. for example, the fluid direction system optionally directs specific amounts of fluidic materials to flow into, e.g., a main channel in such a way as to never produce so much precipitate that it would block the microchannel. Additionally, the fluid direction system can optionally direct the shunting of portions of fluidic materials into shunt microchannels and the like.

The fluid direction system also optionally iteratively repeats the fluid direction movements to create high throughput screening, e.g., of thousands of samples. Alternatively, the fluid direction system optionally repeats the fluid direction movements to a lesser degree of iterations to create a lower throughput screening (applied, e.g., when the specific analysis under observation requires, e.g., a long incubation time when a higher throughput format would be counter-productive) or the fluid direction system utilizes a format of high throughput and low throughput screening depending on the specific requirements of the assay. Additionally, the devices of the invention optionally use a multiplex format to help achieve high throughput screening, e.g., through use of a series of multiplexed sipper devices or multiplexed system of channels coupled to a single controller for screening in order to increase the amount of samples analyzed in a given period of time. Again, the fluid direction system of the invention optionally controls the flow (timing, rate, etc.) of samples, reagents, buffers, etc. involved in the various optional multiplex embodiments of the invention.

One method of achieving transport or movement of particles through microfluidic devices is by electrokinetic material transport. In general, electrokinetic material transport and direction systems include those systems that rely upon the electrophoretic mobility of charged species within an electric field applied to the structure. Such systems are more particularly referred to as electrophoretic material transport systems. In the current invention, electrokinetic transport is optionally used as the method of fluid transport when fluidic materials are, e.g., diluted in the various microchannels and methods of the current invention. However, as explained below, fluid transport methods can also comprise, e.g., pressure based flow, wicking based flow, hydrostatic based flow, etc. See, below.

Electrokinetic material transport systems, as used herein, and as optional aspects of the present invention, include systems that transport and direct materials within a structure containing, e.g., microchannels, microreservoirs, etc., through the application of electrical fields to the materials, thereby causing material movement through and among the areas of the microfluidic devices. e.g., cations will move toward a negative electrode, while anions will move toward a positive electrode. For example, such direction systems optionally, e.g., move specific amounts of fluidic materials into the specifically configured and/or arranged microchannels of the invention in a manner so as not to produce or to ameliorate precipitate blockage. Movement of fluids toward or away from a cathode or anode can cause movement of particles suspended within the fluid (or even particles over which the fluid flows). Similarly, the particles can be charged, in which case they will move toward an oppositely charged electrode (indeed, it is possible to achieve fluid flow in one direction while achieving particle flow in the opposite direction). In some embodiments of the present invention, the fluid and/or particles, etc. within the fluid, can be immobile or flowing.

For optional electrophoretic applications of the present invention, the walls of interior channels of the electrokinetic transport system are optionally charged or uncharged. Typical electrokinetic transport systems are made of glass, charged polymers, and uncharged polymers. The interior channels are optionally coated with a material which alters the surface charge of the channel. A variety of electrokinetic controllers are described, e.g., in U.S. Pat. Nos. 5,885,470, 5,976,336, 6,001,229, 6,010,607, and 6,235,175 (all of which are incorporated herein by reference in their entirety for all purposes), as well as in a variety of other references noted herein.

To provide appropriate electric fields, the system of the current microfluidic device optionally includes a voltage controller that is capable of applying selectable voltage levels, simultaneously, to, e.g., each of the various microchannels, microreservoirs, etc. Such a voltage controller is optionally implemented using multiple voltage dividers and multiple relays to obtain the selectable voltage levels. Alternatively, multiple independent voltage sources are used. The voltage controller is electrically connected to each of the device's fluid conduits via an electrode positioned or fabricated within each of the plurality of fluid conduits (e.g., microchannels, microreservoirs, etc.). In one embodiment, multiple electrodes are positioned to provide for switching of the electric field direction in the, e.g., microchannel(s), thereby causing the analytes to travel a longer distance than the physical length of the microchannel. Use of electrokinetic transport to control material movement in interconnected channel structures was described in, e.g., U.S. Pat. Nos. 6,001,229 and 6,010,607. An exemplary controller is described in U.S. Pat. No. 5,800,690. Modulating voltages are concomitantly applied to the various fluid areas of the device to affect a desired fluid flow characteristic, e.g., continuous or discontinuous (e.g., a regularly pulsed field causing the sample to oscillate its direction of travel) flow of labeled components toward a waste reservoir. Particularly, modulation of the voltages applied at the various areas can move and direct fluid flow through the interconnected channel structure of the device.

The controlling instrumentation discussed above is also optionally used to provide for electrokinetic injection or withdrawal of fluidic material downstream of a region of interest to control an upstream flow rate. The same instrumentation and techniques described above are also utilized to inject a fluid into a downstream port to function as a flow control element.

The current invention also optionally includes other methods of fluid transport, e.g., available for situations in which electrokinetic methods are not desirable. See, above. For example, fluid transport and direction, etc. are optionally carried out in whole, or in part, in a pressure-based system to, e.g., avoid electrokinetic biasing during sample mixing. High throughput systems typically use pressure induced sample introduction. Pressure based flow is also desirable in systems in which electrokinetic transport is also used. For example, pressure based flow is optionally used for introducing and reacting reagents in a system in which the products are electrophoretically separated. In the present invention molecules are optionally loaded and other reagents are flowed through the microchannels, microreservoirs, etc. using, e.g., electrokinetic fluid control and/or under pressure.

Pressure is optionally applied to the microscale elements of the invention, e.g., to a microchannel, microreservoir, region, etc. to achieve fluid movement using any of a variety of techniques. Fluid flow and flow of materials suspended or solubilized within the fluid, including cells or molecules, precipitates, etc., is optionally regulated by pressure based mechanisms such as those based upon fluid displacement, e.g., using a piston, pressure diaphragm, vacuum pump, probe or the like to displace liquid and raise or lower the pressure at a site in the microfluidic system. The pressure is optionally pneumatic, e.g., a pressurized gas, or uses hydraulic forces, e.g., pressurized liquid, or alternatively, uses a positive displacement mechanism, e.g., a plunger fitted into a material reservoir, for forcing material through a channel or other conduit, or is a combination of such forces. Internal sources include microfabricated pumps, e.g., diaphragm pumps, thermal pumps, lamb wave pumps and the like that have been described in the art. See, e.g., U.S. Pat. Nos. 5,271,724; 5,277,566; and 5,375,979 and Published PCT Application Nos. WO 94/05414 and WO 97/02347.

In some embodiments, a pressure source is applied to a reservoir or well at one end of a microchannel to force a fluidic material through the channel. Optionally, the pressure can be applied to multiple ports at channel termini, or, a single pressure source can be used at a main channel terminus. Optionally, the pressure source is a vacuum source applied at the downstream terminus of the main channel or at the termini of multiple channels. Pressure or vacuum sources are optionally supplied externally to the device or system, e.g., external vacuum or pressure pumps sealably fitted to the inlet or outlet of channels or to the surface openings of microreservoirs, or they are internal to the device, e.g., microfabricated pumps integrated into the device and operably linked to channels or they are both external and internal to the device. Examples of microfabricated pumps have been widely described in the art. See, e.g., published International Application No. WO 97/02357.

These applied pressures, or vacuums, generate pressure differentials across the lengths of channels to drive fluid flow through such channels. In the interconnected channel networks described herein, differential flow rates on volumes are optionally accomplished by applying different pressures or vacuums at multiple ports, or, by applying a single vacuum at a common waste port and configuring the various channels with appropriate resistance to yield desired flow rates, e.g., in the various microchannels of, e.g., specifically arranged microchannels so as to, e.g., dilute a fluidic material without producing a precipitate blockage. As discussed above, this is optionally done with multiple sources or by connecting a single source to a valve manifold comprising multiple electronically controlled valves, e.g., solenoid valves.

Hydrostatic, wicking and capillary forces are also optionally used to provide fluid flow of materials such as reagents, buffers, etc. in the invention. See, e.g., U.S. Pat. No. 6,416,642. In using wicking/capillary methods, an adsorbent material or branched capillary structure is placed in fluidic contact with a region where pressure is applied, thereby causing fluid to move towards the adsorbent material or branched capillary structure. Furthermore, the capillary forces are optionally used in conjunction with, e.g., electrokinetic or pressure-based flow in the channels, etc. of the present invention in order to pull fluidic material, etc. through the channels. Additionally, a wick is optionally added to draw fluid through a porous matrix fixed in a microscale channel or capillary. Use of a hydrostatic pressure differential is another optional way to control flow rates through the channels, etc. of the present invention. For example, in a simple passive aspect, a cell suspension is deposited in a reservoir or well at one end of a channel at sufficient volume or depth so that the cell suspension creates a hydrostatic pressure differential along the length of the channel by virtue of, e.g., the cell suspension reservoir having greater depth than a well at an opposite terminus of the channel. Typically, the reservoir volume is quite large in comparison to the volume or flow-through rate of the channel, e.g., 10 microliter reservoirs or larger as compared to a 100 micrometer channel cross section.

The present invention optionally includes mechanisms for reducing adsorption of materials during fluid-based flow, e.g., as are described in U.S. Pat. No. 6,458,259. In brief, adsorption of components, proteins, enzymes, markers and other materials to channel walls or other microscale components during pressure-based flow can be reduced by applying an electric field such as an alternating current to the material during flow. Alternatively, flow rate changes due to adsorption are detected and the flow rate is adjusted by a change in pressure or voltage.

The invention also optionally includes mechanisms for focusing labeling reagents, enzymes, modulators, and other components into the center of microscale flow paths, which is useful in increasing assay throughput by regularizing flow velocity, e.g., in pressure based flow, e.g., as are described in International Patent Application Publication WO 00/70080. In brief, sample materials are focused into the center of a channel by forcing fluid flow from opposing side channels into the main channel, or by other fluid manipulation.

In an alternate embodiment, microfluidic systems of the invention can be incorporated into centrifuge rotor devices, which are spun in a centrifuge. Fluids and particles travel through the device due to gravitational and centripetal/centrifugal pressure forces.

Fluid flow or particle flow in the present devices and methods is optionally achieved using any one or more of the above techniques, alone or in combination. For example, electrokinetic transport can be used in one area or region of a microfluidic device in order to, e.g., move material through a microchannel specifically configured and/or arranged to reduce blockage of the microchannel due to precipitate formation. Additionally, pressure based flow could be used in a different (or the same) region/area of the same microfluidic device where various fluidic materials (again, e.g., cells and enzymes or the like) are to be diluted. Myriad combinations of fluid transport methods can be combined in various embodiments of the present invention depending upon the specific needs of the system/assay being used. Typically, the controller systems involved are appropriately configured to receive or interface with a microfluidic device or system element as described herein. For example, the controller, optionally includes a stage upon which the device of the invention is mounted to facilitate appropriate interfacing between the controller and the device. Typically, the stage includes an appropriate mounting/alignment structural element, such as a nesting well, alignment pins and/or holes, asymmetric edge structures (to facilitate proper device alignment), and the like. Many such configurations are described in the references cited herein.

C. Detection

In general, detection systems in microfluidic devices include, e.g., optical sensors, temperature sensors, pressure sensors, pH sensors, conductivity sensors, and the like. Each of these types of sensors is readily incorporated into the microfluidic systems described herein. In these systems, such detectors are placed either within or adjacent to the microfluidic device or one or more microchannels, microchambers, microreservoirs or conduits of the device, such that the detector is within sensory communication with the device, channel, reservoir, or chamber, etc. Detection systems can be used to, e.g., discern and/or monitor specific reactions, assays, etc. occurring within the microfluidic device, or alternatively, and/or additionally, to track, e.g., precipitate formation and/or microchannel blockage by precipitate. The phrase "proximal," to a particular element or region, as used herein, generally refers to the placement of the detector in a position such that the detector is capable of detecting the property of the microfluidic device, a portion of the microfluidic device, or the contents of a portion of the microfluidic device, for which that detector was intended. For example, a pH sensor placed in sensory communication with a microscale channel is capable of determining the pH of a fluid disposed in that channel. Similarly, a temperature sensor placed in sensory communication with the body of a microfluidic device is capable of determining the temperature of the device itself.

Many different molecular/reaction characteristics can be detected in microfluidic devices of the current invention. For example, various embodiments can detect such things as fluorescence or emitted light, changes in the thermal parameters (e.g., heat capacity, etc.) involved in assays, etc. For example, spectroscopy (as well as other detection methods, e.g., those discussed herein) can be used to detect smooth flow (i.e., the absence of precipitate blockages) in microchannels, etc.

Examples of detection systems in the current invention can include, e.g., optical detection systems for detecting an optical property of a material within, e.g., the microchannels of the microfluidic devices that are incorporated into the microfluidic systems described herein. Such optical detection systems are typically placed adjacent to a microscale channel of a microfluidic device, and optionally are in sensory communication with the channel via an optical detection window or zone that is disposed across the channel or chamber of the device.

Optical detection systems of the invention include, e.g., systems that are capable of measuring the light emitted from material within the channel, the transmissivity or absorbance of the material, as well as the material's spectral characteristics, e.g., fluorescence, chemiluminescence, etc. Detectors optionally detect a labeled compound, such as fluorographic, colorimetric and radioactive components. Types of detectors optionally include spectrophotometers, photodiodes, avalanche photodiodes, microscopes, scintillation counters, cameras, diode arrays, imaging systems, photomultiplier tubes, CCD arrays, scanning detectors, galvo-scanners, film and the like, as well as combinations thereof. Proteins, antibodies, or other components which emit a detectable signal can be flowed past the detector, or alternatively, the detector can move relative to an array to determine molecule position (or, the detector can simultaneously monitor a number of spatial positions corresponding to channel regions, e.g., specific intersections, etc. where precipitate blockages would possibly form or as in a CCD array). Examples of suitable detectors are widely available from a variety of commercial sources known to persons of skill. See, also, *The Photonics Design and Application Handbook*, books 1, 2, 3 and 4, published annually by Laurin Publishing Co., Berkshire Common, P.O. Box 1146, Pittsfield, Mass. for common sources for optical components.

As noted above, the present devices optionally include, as microfluidic devices typically do, one or more detection window or zone at which a signal, e.g., fluorescence, is monitored. This detection window or zone optionally includes a transparent cover allowing visual or optical observation and detection of the assay results, e.g., observation of a calorimetric, fluorometric or radioactive response, or a change in the velocity of a calorimetric, fluorometric or radioactive component.

Another optional embodiment of the present invention involves use of fluorescence correlation spectroscopy and/or confocal nanofluorimetric techniques to detect fluorescence from the molecules in the microfluidic device. Such techniques are easily available (e.g., from Evotec, Hamburg, Germany) and involve detection of fluorescence from molecules that diffuse through the illuminated focus area of a confocal lens. The length of any photon burst observed will correspond to the time spent in the confocal focus by the molecule. Various algorithms used for analysis can be used to evaluate fluorescence signals from individual molecules based on changes in, e.g., brightness, fluorescence lifetime, spectral shift, FRET, quenching characteristics, etc.

The sensor or detection portion of the devices and methods of the present invention can optionally comprise a number of different apparatuses. For example, fluorescence can be detected by, e.g., a photomultiplier tube, a charge coupled device (CCD) (or a CCD camera), a photodiode, or the like.

A photomultiplier tube is an optional aspect of the current invention. Photomultiplier tubes (PMTs) are devices which convert light (photons) into electronic signals. The detection of each photon by the PMT is amplified into a larger and more easily measurable pulse of electrons. PMTs are commonly used in many laboratory applications and settings and are well known to those in the art.

Another optional embodiment of the present invention comprises a charge coupled device (CCD). CCD cameras can detect even very small amounts of electromagnetic energy (e.g., such that emitted by fluorophores). CCD cameras are made from semi-conducting silicon wafers that release free electrons when struck by light photons. The output of electrons is linearly directly proportional to the amount of photons that strike the wafer. This allows correlation between the image brightness and the actual brightness of the event observed. CCD cameras are very well suited for imaging of fluorescence emissions since they can detect even extremely faint events, can work over a broad range of spectrum, and can detect both very bright and very weak events. CCD cameras are well known to those in the art and several suitable examples include those made by: Stratagene (La Jolla, Calif.), Alpha-Innotech (San Leandro, Calif.), and Apogee Instruments (Tucson, Ariz.) among others.

Yet another optional embodiment of the present invention comprises use of a photodiode to detect fluorescence from molecules in the microfluidic device. Photodiodes absorb incident photons which cause electrons in the photodiode to diffuse across a region in the diode thus causing a measurable potential difference across the device. This potential can be measured and is directly related to the intensity of the incident light.

In some aspects, the detector measures an amount of light emitted from the material, such as a fluorescent or chemiluminescent material. As such, the detection system will typically include collection optics for gathering a light based signal transmitted through the detection window or zone, and transmitting that signal to an appropriate light detector. Microscope objectives of varying power, field diameter, and focal length are readily utilized as at least a portion of this optical train. The detection system is typically coupled to a computer (described in greater detail below), via an analog to digital or digital to analog converter, for transmitting detected light data to the computer for analysis, storage and data manipulation.

In the case of fluorescent materials such as labeled cells or fluorescence indicator dyes or molecules, the detector optionally includes a light source which produces light at an appropriate wavelength for activating the fluorescent material, as well as optics for directing the light source to the material contained in the channel. The light source can be any number of light sources that provides an appropriate wavelength, including lasers, laser diodes and LEDs. Other light sources are optionally utilized for other detection systems. For example, broad band light sources for light scattering/transmissivity detection schemes, and the like. Typically, light selection parameters are well known to those of skill in the art.

The exact design or methodology appropriate to monitoring precipitation and/or precipitation blockages optionally depends upon the material at issue. Where precipitate can be viewed optically (e.g., using a microscope), precipitate blockage can be directly monitored by simply viewing one or more areas of microchannels through which material is flowed. Precipitate blockage is characterized by immobilization of material in a region of a microchannel. Materials (i.e., precipitates) such as proteins, nucleic acids, etc. can be made viewable by incorporation of labels such as fluorophores, radioactive labels, labeled antibodies, dyes, and the like (of course, other precipitates are inherently fluorescent, etc.) and can similarly be directly monitored by detecting, e.g., label signal levels in appropriate portions of microchannels through any of the detection means/methods/procedures described above, and/or through use of any other detection means available to those in the art.

Additionally, indirect detection/monitoring of precipitate blockages is also optionally used. For example, controls comprising assay elements for a control assay can be flowed through a channel and the results of the assay monitored and compared to expected results. Where the results of the assay are not as predicted, or change markedly over time, it can be inferred that precipitate blockage is interfering with the assay components. Similarly, if experimental or assay components are capable of being, e.g., optically detected through fluorescence and the like, then their presence can be monitored in a certain area of microchannel (e.g., downstream from a junction where a material capable of precipitation is diluted, etc.). If the experimental/assay component is no longer detected or is detected in much lower amounts, then it can be inferred that a precipitate blockage has occurred upstream from the detection area.

The detector can exist as a separate unit, but is preferably integrated with the controller system, into a single instrument. Integration of these functions into a single unit facilitates connection of these instruments with a computer (described below), by permitting the use of few or a single communication port(s) for transmitting information between the controller, the detector and the computer. Integration of the detection system with a computer system typically includes software for converting detector signal information into assay result information, e.g., concentration of a substrate, concentration of a product, presence of a compound of interest, presence of a precipitate blockage of a microchannel, interaction between various samples, or the like.

D. Computer

As noted above, either, or both, the fluid direction system or the detection system, as well as other aspects of the current invention described herein (e.g., fluid flow control, temperature control, etc.), are optionally coupled to an appropriately programmed processor or computer that functions to instruct the operation of these instruments in accordance with preprogrammed or user input instructions, receive data and information from these instruments, and interpret, manipulate and report this information to a user. As such, the computer is typically appropriately coupled to one or more of the appropriate instruments (e.g., including an analog to digital or digital to analog converter as needed).

The computer optionally includes appropriate software for receiving user instructions, either in the form of user input into set parameter fields, e.g., in a GUI, or in the form of preprogrammed instructions, e.g., preprogrammed for a variety of different specific operations. The software then converts these instructions to appropriate language for instructing the operation of, e.g., the fluid direction and transport controller to carry out the desired operation.

For example, the computer is optionally used to direct a fluid direction system to control fluid flow, e.g., into and through a variety of interconnected microchannels (e.g., into and through the various microchannels of the invention, such as specially configured cross-sectional geometry areas and/or specific channel arrangements used to reduce precipitate blockage of the microchannels, etc.). Additionally, the fluid direction system optionally directs fluid flow controlling which samples are contacted with each other and/or with various reagents, buffers, etc. in, e.g., a detection region or other region(s) in the microfluidic device. Furthermore, the fluid direction system optionally controls the coordination of movements of multiple fluids/molecules/etc. concurrently as well as sequentially. For example, the computer optionally directs the fluid direction system to direct the movement of at least a first member of a plurality of molecules into a first member of a plurality of microchannels concurrent with directing the movement of at least a second member of the plurality of molecules into one or more detection channel regions.

Additionally or alternatively, the fluid direction system directs the movement of at least a first member of the plurality of molecules into the plurality of microchannels concurrent with incubating at least a second member of the plurality of molecules or directs movement of at least a first member of the plurality of molecules into the one or more detection channel regions concurrent with incubating at least a second member of the plurality of molecules.

By coordinating channel switching, the computer-controlled fluid direction system directs the movement of at least one member of the plurality of molecules into the plurality of microchannels and/or one member into a detection region at a desired time interval, e.g., greater than 1 minute, about every 60 seconds or less, about every 30 seconds or less, about every 10 seconds or less, about every 1.0 seconds or less, or about every 0.1 seconds or less. Each sample, with appropriate channel switching as described above, remains in the plurality of channels for a desired period of time, e.g., between about 0.1 minutes or less and about 60 minutes or more. For example, the samples optionally remain in the channels for a selected incubation time of, e.g., 20 minutes.

As another example, the computer optionally controls the application of an AC electric field across a microchannel area (orthogonal to the direction of fluid flow) where precipitation can occur. Such AC flow is optionally directed by the computer to be applied only when a precipitatable material (and/or a precipitate inducing material) is present in that region.

The computer optionally receives data from one or more sensors/detectors included within the system, interprets the data, and either provides it in a user understood format, or uses that data to initiate further controller instructions, in accordance with the programming, e.g., such as in monitoring and control of flow rates (e.g., as involved in dilution of materials in microchannels, etc.), temperatures, applied voltages, pressures, and the like.

In the present invention, the computer typically includes software for the monitoring and control of materials in the various microchannels, etc. For example, the software directs channel switching to control and direct flow as described above. Additionally the software is optionally used to control electrokinetic, pressure-modulated, or the like, injection or withdrawal of material. The computer also typically provides instructions, e.g., to the controller or fluid direction system for switching flow between channels to help achieve a high throughput format.

In addition, the computer optionally includes software for deconvolution of the signal or signals from the detection system. For example, the deconvolution distinguishes between two detectably different spectral characteristics that were both detected, e.g., when a substrate and product comprise detectably different labels or where one fluorescent species is used to check for precipitate while another fluorescent species is used in a separate assay/experiment.

Any controller or computer optionally includes a monitor which is often a cathode ray tube ("CRT") display, a flat panel display (e.g., active matrix liquid crystal display, liquid crystal display), or the like. Data produced from the microfluidic device, e.g., indication of a microchannel free of precipitate blockage, fluorographic indication of binding between selected molecules, etc., is optionally displayed in electronic form on the monitor. Additionally, the data gathered from the microfluidic device can be outputted in printed form. The data, whether in printed form or electronic form (e.g., as displayed on a monitor), can be in various or multiple formats, e.g., curves, histograms, numeric series, tables, graphs and the like.

Computer circuitry is often placed in a box which includes, e.g., numerous integrated circuit chips, such as a microprocessor, memory, interface circuits, etc. The box also optionally includes such things as a hard disk drive, a floppy disk drive, a high capacity removable drive such as a writeable CD-ROM, and other common peripheral elements. Inputting devices such as a keyboard or mouse optionally provide for input from a user and for user selection of sequences to be compared or otherwise manipulated in the relevant computer system.

E. Example Integrated System

Figure 3:
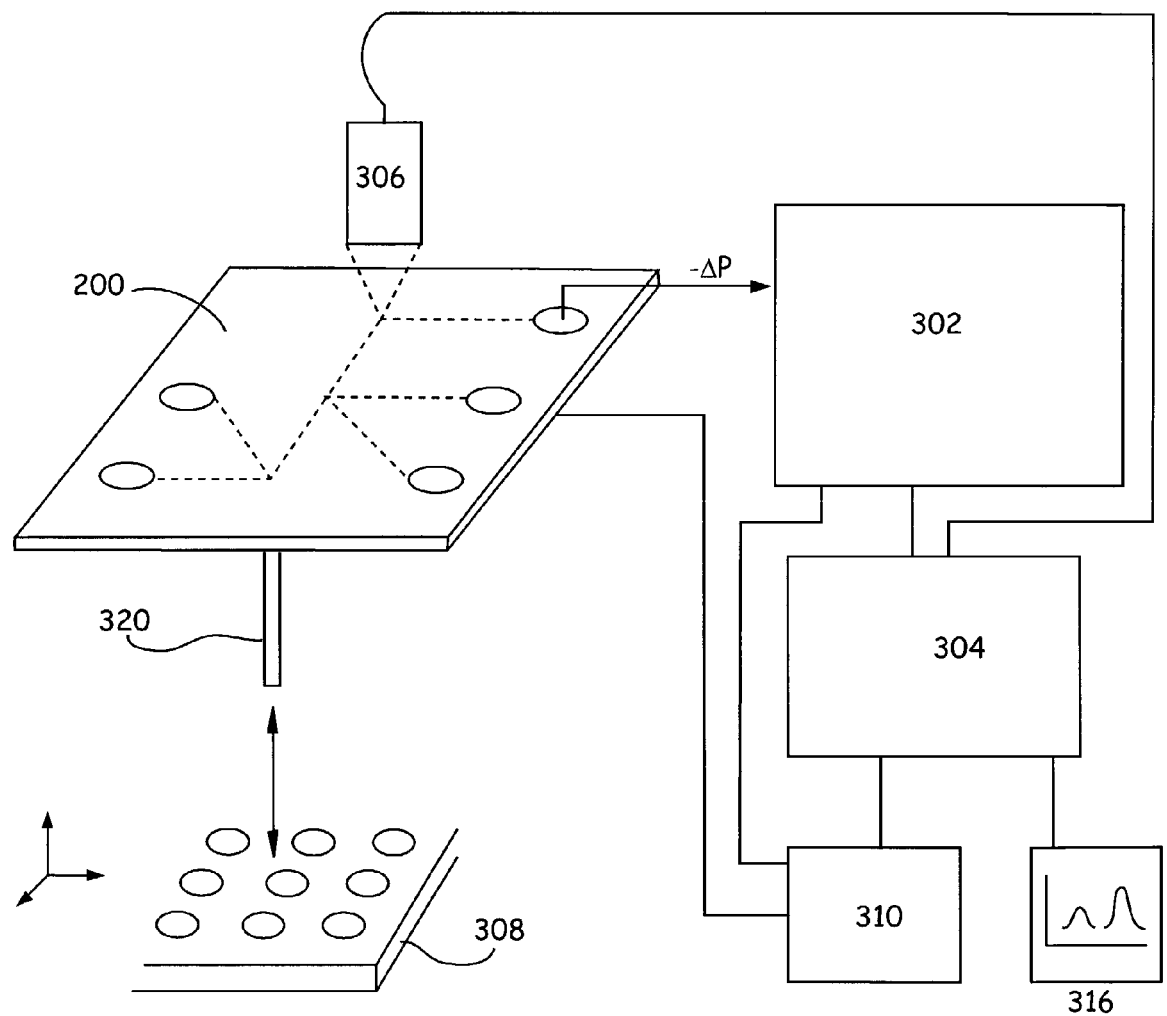
FIG. 3, is a schematic view of an integrated system comprising a microfluidic device incorporating the elements of the invention.

FIG. 2, Panels A, B, and C and FIG. 3 provide additional details regarding example integrated systems that optionally use the devices of the invention and optionally are used to practice the methods herein. As shown, body structure 202 has main channels 204 and 206 disposed therein. As stated previously, the arrangement and configuration of the microchannels of the current invention can comprise a number of different possibilities and that displayed in FIG. 2 is but one possible arrangement/configuration. As shown in FIG. 2, main channel 206 comprises a microchannel whose cross-sectional geometry is configured to reduce the effects of precipitate formation (i.e., to keep blockages from forming) due to accumulation of precipitate, e.g., that of DMSO or any other type of precipitation. Also as shown in FIG. 2, main channel 204, is arranged with other microchannels (as detailed below) to allow, e.g., gradual dilutions in order to minimize formation of unwanted precipitate blockages in the microchannel.

In FIG. 2, a sample or mixture of components, e.g., typically a buffer, sample, reagent, etc. typically also comprising DMSO or any other precipitatable material, is optionally flowed from pipettor channel 220, towards, e.g., reservoir 218, e.g., by applying a vacuum at reservoir 218 (or another point in the system) or by applying appropriate voltage gradients or wicking arrangements, etc. (or a combination of such forces). Alternatively, a vacuum, or appropriate pressure force, etc. is applied at, e.g., reservoirs 222, 224, 226, or through pipettor channel 220. Additional materials, such as buffer solutions, substrate solutions, enzyme solutions, test molecules, fluorescence indicator dyes or molecules and the like are optionally flowed from wells, e.g., 222, 224, or 226 and into channel 206.

Such solutions (or, e.g., water) when flowed into main channel 206 can cause precipitation of material from the fluidic material already present in the main channel 204 (or, alternatively and/or additionally, a precipitate may form from the fluidic material flowed into main channel 206). For example, as explained above a fluidic material comprising DMSO is optionally flowed through channel 206. Fluidic materials flowed from, e.g., reservoir 226 to, e.g., dilute the fluidic material in channel 206 may cause precipitation of the DMSO. However, as illustrated in FIG. 2, the fluidic material from reservoir 226 empties into channel 206 in region 230. Region 230 comprises a microchannel region of enlarged cross-sectional area (see above description of FIG. 1a). Such enlarged cross-sectional areas of channel 206 (i.e., regions 228 and 230) prevent formation of precipitate blockages of channel 206 and allow the free flow of the fluidic materials through the channel. In some optional embodiments, an AC electric field is applied orthogonal to the direction of fluid flow, e.g., in region 230 or in other areas (see, FIGS. 4 and 5 and accompanying description).

Alternatively, a sample or mixture of component, e.g., typically a buffer, sample, reagent, etc., is optionally flowed from pipettor channel 220 towards, e.g., reservoir 214 by any flow methods as described herein. Additional materials, such as buffer solutions, substrate solutions, enzyme solutions, test molecules, fluorescence indicator dyes or molecules and the like, are optionally flowed from wells, e.g., 208, 210, or 212 and into channel 204. Again, as described above for FIG. 1 (i.e., FIG. 1b description, see, supra), arrangements of such microchannels, etc. allow for gradual dilutions (or additions of fluidic materials) to reach a desired concentration, etc. while preventing blockage of main channel 204 by precipitation. In other words, any precipitate formed is formed in small amounts at a time rather than all at once as would happen if, e.g., the fluidic material in channel 204 were diluted in one large step to a final concentration by a fluidic material from reservoir 208. Instead, as FIG. 2a shows, the fluidic material in channel 204 is diluted in steps (i.e., through additions from reservoirs 208, 210, 212 and with shunting to waste reservoir 216).

The arrangement of channels depicted in FIG. 2 is only one possible arrangement out of many which are appropriate and available for use in the present invention. For example, the number and arrangement of, e.g., microchannels comprising sources of fluidic materials for dilutions steps and/or regions of larger cross-sectional area (both to prevent precipitate blockage of the microchannel) can all be altered depending upon the specific parameters of the assays to be performed, the need for high throughput analysis, etc. Additional alternatives can be readily devised, e.g., by combining the microfluidic elements described herein with other microfluidic devices described in the patents and applications referenced herein. Furthermore, again, an AC electric field can be applied orthogonal to the direction of fluid flow to help prevent sticking of precipitates to microchannel walls (see, FIGS. 4 and 5 and accompanying description).

Samples and materials are optionally flowed from the enumerated wells or from a source external to the body structure. As depicted, the integrated system optionally includes pipettor channel 220, e.g., protruding from body 202, for accessing a source of materials external to the microfluidic system. Typically, the external source is a microtiter dish or other convenient storage medium. For example, as depicted in FIG. 3, pipettor channel 220 can access microwell plate 308, which, in the wells of the plate, optionally includes, e.g., samples, buffers, fluorescence dyes, various fluidic reagents to be interacted with the samples, etc.

Detector 306 is in sensory communication with, e.g., main channels 204 or 206, detecting signals resulting, e.g., from labeled materials flowing through the detection region (e.g., indicating clear flow or no precipitate blockages), changes in thermal parameters, fluorescence, etc. Detector 306 is optionally coupled to any of the channels or regions of the device where detection is desired (e.g., at intersections of microchannels where fluidic materials are to be diluted, etc.). Detector 306 can optionally detect any precipitate formation occurring channel 204 and/or 206. Detector 306 is operably linked to computer 304, which digitizes, stores, and manipulates signal information detected by detector 306, e.g., using any of the instructions described above or any other instruction set, e.g., for determining precipitate blockages, concentration, molecular weight or identity, interaction between samples and test molecules, or the like.

Fluid direction system 302 controls voltage, pressure, etc. (or a combination of such), e.g., at the wells of the systems or through the channels of the system, or at vacuum couplings fluidly coupled to, e.g., channel 204, 206 or any other channel described above. Optionally, as depicted, computer 304 controls fluid direction system 302. In one set of embodiments, computer 304 uses signal information to select further parameters for the microfluidic system. For example, upon detecting the formation of a precipitate is detected in, e.g., channel 204, the dilution amounts, time, etc. can be adjusted to prevent any blockage of the microchannel by the precipitate.

Temperature control system 310 controls joule and/or non-joule heating at, e.g., the wells of the systems or through the channels of the system as described herein. Optionally, as depicted, computer 304 controls temperature control system 310. In one set of embodiments, computer 304 uses signal information to select further parameters for the microfluidic system. For example, upon detecting the desired temperature in a sample in, e.g., channel 204, the computer optionally directs addition of, e.g., a diluting fluidic material, a potential binding molecule, fluorescence indicator dye, etc. into the system to be tested against one or more samples.

Monitor 316 displays the data produced by the microfluidic device, e.g., graphical representation of, e.g., presence or non-presence of precipitate blockages, separation or non-separation of fluidic materials, interaction (if any) between samples, reagents, test molecules, etc. Optionally, as depicted, computer 304 controls monitor 316. Additionally, computer 304 is connected to and directs additional components such as printers, electronic data storage devices and the like.

F. Assay Kits

The present invention also provides kits for utilizing the microfluidic devices and methods of the invention. In particular, these kits typically include microfluidic devices, systems, modules and workstations, etc. A kit optionally contains additional components for the assembly and/or operation of a multimodule workstation of the invention including, but not restricted to robotic elements (e.g., a track robot, a robotic armature, or the like), plate handling devices, fluid handling devices, and computers (including e.g., input devices, monitors, c.p.u., and the like).

Generally, the microfluidic devices described herein are optionally packaged to include some or all reagents for performing the device's functions. For example, the kits can optionally include any of the microfluidic devices described along with assay components, buffers, reagents, enzymes, serum proteins, receptors, sample materials, antibodies, substrates, control material, spacers, buffers, immiscible fluids, etc., for performing assays, separations, etc. using the methods/devices of the invention, i.e., the methods/devices to prevent and/or ameliorate formation of precipitate blockages. In the case of prepackaged reagents, the kits optionally include pre-measured or pre-dosed reagents that are ready to incorporate into assays without measurement, e.g., pre-measured fluid aliquots, or pre-weighed or pre-measured solid reagents that can be easily reconstituted by the end-user of the kit.

Such kits also typically include appropriate instructions for using the devices and reagents, and in cases where reagents (or all necessary reagents) are not predisposed in the devices themselves, with appropriate instructions for introducing the reagents into the channels/chambers/reservoirs/etc. of the device. In this latter case, these kits optionally include special ancillary devices for introducing materials into the microfluidic systems, e.g., appropriately configured syringes/pumps, or the like (in one embodiment, the device itself comprises a pipettor element, such as an electropipettor for introducing material into channels/chambers/reservoirs/etc. within the device). In the former case, such kits typically include a microfluidic device with necessary reagents predisposed in the channels/chambers/reservoirs/etc. of the device. Generally, such reagents are provided in a stabilized form, so as to prevent degradation or other loss during prolonged storage, e.g., from leakage. A number of stabilizing processes are widely used for reagents that are to be stored, such as the inclusion of chemical stabilizers (e.g., enzymatic inhibitors, microbicides/bacteriostats, anticoagulants, etc.), the physical stabilization of the material, e.g., through immobilization on a solid support, entrapment in a matrix (e.g., a bead, a gel, etc.), lyophilization, or the like.

The elements of the kits of the present invention are typically packaged together in a single package or set of related packages. The package optionally includes written instructions for utilizing one or more device of the invention in accordance with the methods described herein. Kits also optionally include packaging materials or containers for holding the microfluidic device, system or reagent elements.

The discussion above is generally applicable to the aspects and embodiments of the invention described herein. Moreover, modifications are optionally made to the methods and devices described herein without departing from the spirit and scope of the invention as claimed, and the invention is optionally put to a number of different uses including the following:

The use of a microfluidic system containing at least a first substrate and having a first channel and a second channel intersecting the first channel, at least one of the channels having at least one cross-sectional dimension in a range from 0.1 to 500 micrometer, in order to test the effect of each of a plurality of test compounds on a biochemical system comprising one or more focused cells or particles.

The use of a microfluidic system as described herein, wherein a biochemical system flows through one of said channels substantially continuously, providing for, e.g., sequential testing of a plurality of test compounds.

The use of a microfluidic device as described herein to modulate reactions within microchannels/microchambers/reservoirs/etc.

The use of electrokinetic injection in a microfluidic device as described herein to modulate or achieve flow in the channels.

The use of a combination of wicks, electrokinetic injection and pressure based flow elements in a microfluidic device as described herein to modulate, focus, or achieve flow of materials, e.g., in the channels of the device.

An assay utilizing a use of any one of the microfluidic systems or substrates described herein.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, patent documents, or other documents cited in this application are incorporated by reference in their entirety for all purposes to the same extent as if each individual publication, patent, patent application, patent document, or other document were individually indicated to be incorporated by reference for all purposes.

What is claimed is:

1. A microfluidic device which is structurally configured to reduce precipitate blockage in a microchannel of the device, comprising:
   a) a first microchannel comprising a first region upstream of one or more second region, which second region is upstream of one or more third region, which second region comprises a greater cross-sectional area than the first region or the third region;
   b) at least a second microchannel, which second microchannel fluidly intersects with the second region of the first microchannel;
   c) a source of a first fluidic material, which source is fluidly coupled to the first microchannel;
   d) a source of a second fluidic material, which source is fluidly coupled to the second microchannel, wherein the first and second fluidic materials form a precipitate when mixed;
   e) a fluid direction system which, during operation of the device, controllably moves the first fluidic material through the first microchannel and the second fluidic material through the second microchannel into the second region of the first microchannel thereby forming a mixture and a precipitate in the second region of the first microchannel which precipitate is present at a concentration which does not inhibit flow of the mixture into the third region of the microchannel.

2. The microfluidic device of claim 1, wherein the first fluidic material comprises DMSO.

3. The microfluidic device of claim 1, wherein the second fluidic material comprises a buffer.

4. The microfluidic device of claim 1, wherein the second fluidic material comprises water.

5. The microfluidic device of claim 1, wherein the second region of the first microchannel is at least 2 times or more greater in cross-sectional area than the first or third region of the first microchannel.

6. The microfluidic device of claim 1, wherein the second region of the first microchannel is at least about 5 times or more greater in cross-sectional area than the first or third region of the first microchannel.

7. The microfluidic device of claim 1, wherein the second region of the first microchannel is at least about 10 times or snore greater in cross-sectional area than the first or third region of the first microchannel.

8. The microfluidic device of claim 1, wherein the second region of the first microchannel is at least about 15 times or more greater in cross-sectional area than the first or third region of the first microchannel.

9. The microfluidic device of claim 1, wherein the second region of the first microchannel is at least about 20 times or more greater in cross-sectional area than the first or third region of the first microchannel.

10. The microfluidic device of claim 1, wherein the cross-sectional area of the second region is great enough to prevent precipitate blockage of the microchannel by the precipitate concentration.

11. The microfluidic device of claim 1, the device further comprising wherein the first microchannel is structurally configured to permit application of an AC electric field orthogonal to a direction of fluid flow in the first microchannel.

* * * * *